United States Patent
Marcotte

(10) Patent No.: US 7,624,207 B2
(45) Date of Patent: Nov. 24, 2009

(54) METHOD, SYSTEM AND PROGRAM PRODUCTS FOR REDUCING DATA MOVEMENT WITHIN A COMPUTING ENVIRONMENT

(75) Inventor: Scott Thomas Marcotte, Vestal, NY (US)

(73) Assignee: International Business Machines Corporation, Armonk, NY (US)

( * ) Notice: Subject to any disclaimer, the term of this patent is extended or adjusted under 35 U.S.C. 154(b) by 723 days.

(21) Appl. No.: 10/981,210

(22) Filed: Nov. 4, 2004

(65) Prior Publication Data

US 2005/0091244 A1 Apr. 28, 2005

Related U.S. Application Data

(62) Division of application No. 09/442,906, filed on Nov. 18, 1999, now Pat. No. 6,910,082.

(51) Int. Cl.
*G06F 3/00* (2006.01)
*G06F 13/00* (2006.01)
(52) U.S. Cl. .......................... 710/52; 710/56
(58) Field of Classification Search .................. None
See application file for complete search history.

(56) References Cited

U.S. PATENT DOCUMENTS 5,202,971 A 4/1993 Henson et al. ............. 395/425
5,594,863 A 1/1997 Stiles ..................... 395/182.13
5,740,367 A 4/1998 Spilo ..................... 395/200.31
5,745,756 A 4/1998 Henley ........................ 395/620
5,799,150 A 8/1998 Hamilton et al. ....... 395/200.33
5,838,916 A 11/1998 Domenikos et al. .... 395/200.49
6,724,896 B1 * 4/2004 Beckett et al. .............. 380/255
6,742,092 B1 * 5/2004 Huebsch et al. ............ 711/162
2002/0188691 A1* 12/2002 Ignatius et al. ............ 709/208

OTHER PUBLICATIONS

"Multiple Caching Schemes In A Lan-Attached Server," IBM Technical Disclosure Bulletin, vol. 38, No. 04, Apr. 1995, pp. 143-145.
"Warp Server (SMB) Authentication From A Windows NT Client," IBM Technical Disclosure Bulletin, vol. 40, No. 10, Oct. 1997, pp. 99-100.
"Programmable High Performance Memory Buffer," IBM Technical Disclosure Bulletin, vol. 36, No. 10, Oct. 1993, pp. 569-570.

* cited by examiner

*Primary Examiner*—Tariq R. Hafiz
*Assistant Examiner*—Scott Sun
(74) *Attorney, Agent, or Firm*—Christopher & Weisberg, P.A.

(57) ABSTRACT

Data movement within a computing environment is at the very least reduced. Data is transmitted between a file system of the computing environment and a transmission medium of that environment. The transmission includes bypassing non-file system buffers in performing the transmission. For example, when data is sent to the file system to be written to one or more storage media, the file system swaps one or more buffers of the file system with the one or more buffers containing the data. The swapping does not require the copying of data. Further, for a read operation, the file system calls a routine, which is provided with one or more pointers to the data that is to be sent to a requester of the data.

18 Claims, 17 Drawing Sheets

METHOD, SYSTEM AND PROGRAM PRODUCTS FOR REDUCING DATA MOVEMENT WITHIN A COMPUTING ENVIRONMENT

CROSS-REFERENCE TO RELATED APPLICATIONS

This is a division of U.S. patent application Ser. No. 09/442,906 entitled "METHOD, SYSTEM AND PROGRAM PRODUCTS FOR REDUCING DATA MOVEMENT WITHIN A COMPUTING ENVIRONMENT" filed Nov. 18, 1999 now U.S. Pat. No. 6,910,082 by Scott Marcotte.

This application contains subject matter which is related to the subject matter of the following application, which is assigned to the same assignee as this application and filed on the same day as this application. The below listed application is hereby incorporated herein by reference in its entirety:

"Managing The Flow Of Information Between Senders And Receivers Of A Computing Environment To Enhance Performance Of The Environment", Scott T. Marcotte, Ser. No. 09/442,910, filed herewith.

TECHNICAL FIELD

This invention relates, in general, to processing read and write requests within a computing environment, and in particular, to enhancing the performance of those requests.

BACKGROUND ART

Enhancing the performance of read and write requests is an important goal of many computing systems, including distributed file systems, such as Distributed File Services (DFS) systems. When writing or reading files, especially large files, the time it takes for the request and data to be transmitted across the network often adversely dominates the response time of the request. Thus, efforts have been made to reduce the network time and hence, the response time.

These efforts include locally caching data to avoid communications across the network and processing requests in parallel to improve response time. However, even with these efforts, systems still encounter considerable delays in data transmission, which negatively affects response time.

In addition to the above, response time is also negatively impacted by extra data movements within a computing system. For example, in systems, such as Distributed File Services (DFS) systems, data is moved from one set of buffers within the server to another set of buffers within the server. This data movement results in extra processing time at the server, which negatively impacts response time.

Based on the foregoing, a need still exists for a capability that enhances the performance of read and write requests. A further need exists for a capability that improves data transmission. A yet further need exists for a capability that eliminates extra data movements in an effort to enhance response time.

SUMMARY OF THE INVENTION

The shortcomings of the prior art are overcome and additional advantages are provided through the provision of a method of reducing data movement within a computing environment. In one embodiment, the method includes transmitting data between a file system of a computing unit of the computing environment and a transmission medium of the computing environment, wherein the transmitting includes bypassing non-file system buffers of the computing unit in performing the transmission.

In one example, the transmitting includes sending data from a sender of the computing environment over the transmission medium to the file system to be written to one or more storage media coupled to the file system. As a further example, the sending includes sending the data over the transmission medium using one or more buffers associated with the sender. The file system receives the data, wherein the receiving includes swapping one or more buffers associated with the file system with the one or more buffers associated with the sender.

In another example, the transmitting includes sending data from the file system over the transmission medium to a receiver of the data. In a further example, the sending includes using a routine identified by the receiver to send the data, wherein the routine is provided one or more pointers to the data to be sent to the receiver.

In a further aspect of the present invention, a method of reducing data movement within a computing environment is provided. The method includes, for instance, sending data from a sender of the computing environment to a file system of the computing environment, wherein the sending includes using one or more buffers associated with the sender; and receiving by the file system the data, wherein the receiving includes swapping one or more buffers associated with the file system with the one or more buffers associated with the sender.

In a further aspect of the present invention, a method of translating data from one format to another format is provided. The method includes, for instance, determining that data located in at least one buffer associated with a file system usable in writing data to one or more storage media coupled to the file system is to be translated from one format to another format; and translating at least a portion of the data in the at least one buffer. The translating being performed within the at least one buffer associated with the file system without requiring copying of the at least portion of the data to one or more other buffers.

Systems and computer program products corresponding to the above-summarized methods are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly. Claimed in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

In accordance with one aspect of the present invention, a quick reply is sent from a receiver of a packet to a sender of the packet indicating receipt of the packet, prior to receiving the entire packet. This allows data to be sent to the receiver as fast as possible by, for example, keeping the data streaming over the communications or transmission medium between the sender and the receiver. In a further aspect of the present invention, a reply to a request is sent from a receiver of the request to the sender of the request, prior to providing the request to a file system coupled to the receiver.

In accordance with another aspect of the present invention, data movement within a computing environment is reduced, at the very least. In particular, data is transmitted between a file system of a computing unit of the computing environment and a transmission medium of the computing environment, such that non-file system buffers of the computing unit are bypassed in performing the transmission. As one example, during a file read operation, data is transmitted directly from the file system cache buffers to the requester of that data. As a further example, for a file write operation, buffer swapping in the file server is used to avoid data movement.

Figure 1:
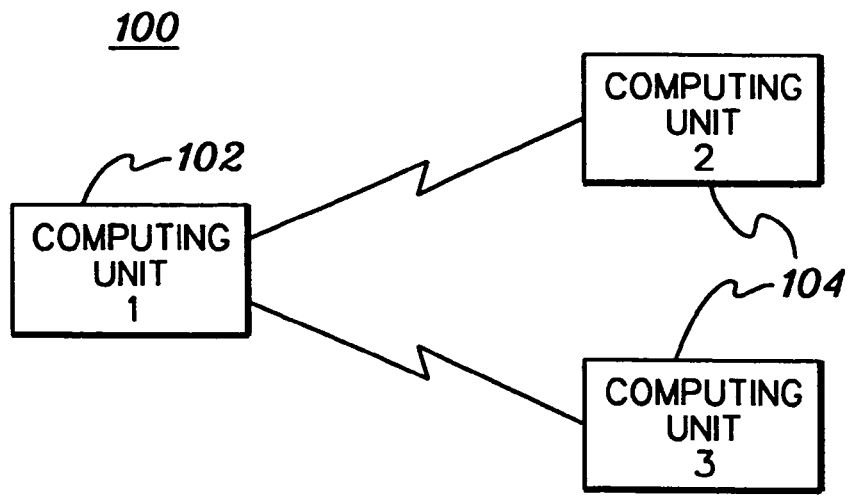
FIG. 1 depicts one example of a computing environment incorporating and using the various aspects of the present invention.

One embodiment of a computing environment incorporating and using the capabilities of the present invention is described with reference to FIG. 1. A computing environment 100 includes, for instance, at least one computing unit 102 coupled to one or more other computing units 104. In one example, computing unit 102 is a server, while computing units 104 are clients. Each unit includes, for example, one or more central processing units, memory and one or more input/output devices, as is well known in the art.

Computing unit 102 is based, for instance, on the Enterprise Systems Architecture (ESA)/390 offered by International Business Machines Corporation, Armonk, N.Y. ESA/390 is described in an IBM publication entitled "Enterprise Systems Architecture/390 Principles of Operation," IBM Publication No. SA22-7201-04, June 1997, which is hereby incorporated herein by reference in its entirety. One example of a computing unit based on ESA/390 is the 9672 Parallel Enterprise Server offered by International Business Machines Corporation.

One or more of computing units 104 are personal computers. As one example, a computing unit 104 is a personal computer executing Microsoft Windows, which runs on the Intel PC architecture. In one instance, one or more of computing units 104 include Server Message Block (SMB)/Common Internet File System (CIFS) clients.

Computing unit 102 is coupled to one or more of computing units 104 via a standard connection, such as any type of wire connection, token ring or network connection, to name just a few examples. One communications protocol used by one or more of these connections is TCP/IP.

The above-described computing environment and/or computing units are only offered as examples. The present invention can be incorporated and used with many types of computing units, computers, processors, nodes, systems, workstations and/or environments without departing from the spirit of the present invention. For example, one or more of the units may be based on the UNIX architecture or may include the Intel PC architecture. Additionally, while some of the embodiments described herein are discussed in relation to servers and clients, and in particular, to a file server and clients, such embodiments are only examples. Other types of receivers and senders of information, other types of servers and/or other types of computing environments can benefit from the present invention and are thus, considered a part of the present invention.

Additionally, in various aspects of the present invention, the clients need not be remote from the server. Various aspects of the invention are equally applicable to clients and servers running on the same physical machine, different physical machines or any combination thereof.

Figure 2:
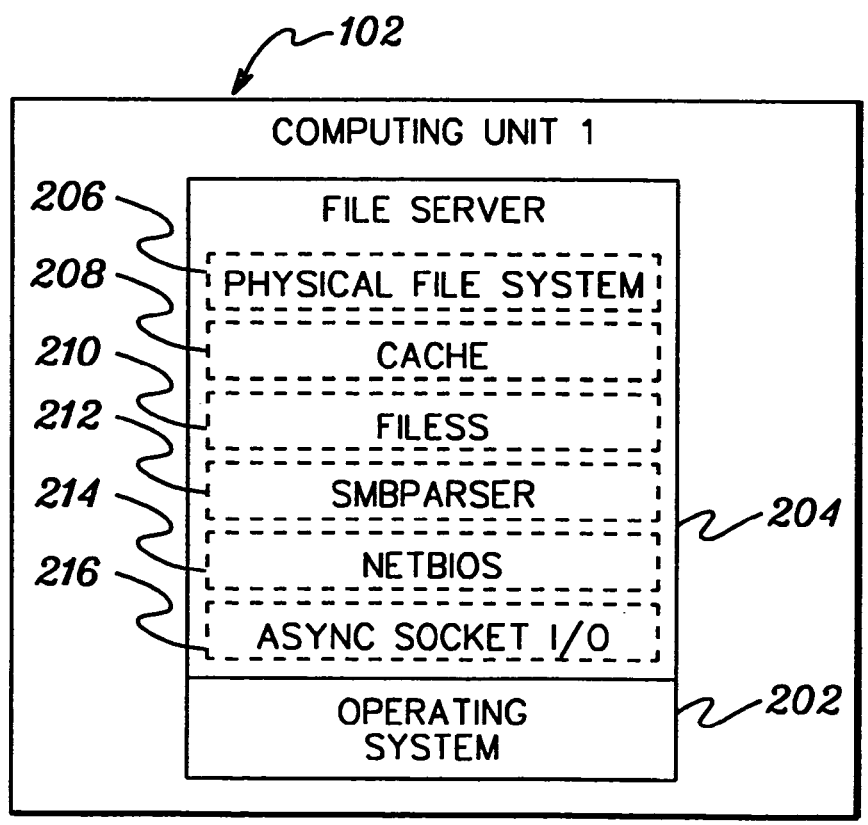
FIG. 2 depicts further details of a computing unit of FIG. 1, in accordance with the principles of the present invention.

Further details of computing unit 102 are described with reference to FIG. 2. In one example, computing unit 102 includes an operating system 202, such as the OS/390 or MVS operating system offered by International Business Machines Corporation. Running on the operating system is, for instance, a file server 204. In one example, file server 204 is an OS/390 Unix Distributed File Services (DFS) server. File server 204 includes a plurality of layers, such as, for instance, a physical file system (PFS) layer 206, a cache 208, a file specific server (files) layer 210, an SMBparser layer 212, a Netbios layer 214 and an Asynchronous Socket I/O layer 216. Although each of the layers is shown as a part of the file server, one or more of the layers can be coupled to the file server. Thus, the layers are considered associated with the file server, as well as with the computing unit.

Physical file system 206 is the layer of the file server used to write information to and/or read information from the storage media (such as, for instance, disks) coupled to the physical file system. In one example, the physical file system retrieves information from its cache 208 and writes that information to the storage media. As a further example, the physical file system retrieves information from the storage media, places it in its cache, and then forwards it to the requesters of that information.

File specific server layer 210 is the layer that transforms SMBparser requests into cache and physical file system requests, and also interfaces with a DFS token management service to manage the sharing of files between clients.

SMBparser layer 212 is the main SMB processing layer that knows the state of the environment relative to the client (e.g., what files are open, etc.). When this layer is called, the client session is in a stopped state. Thus, no more requests are received from the client, while it is in this state. The lowest SMB layers call Netbios to re-enable the session after performing some preliminary processing.

Netbios layer 214 is responsible for maintaining communications between the server and the clients. It is conduit between the SMBparser layer and the Asynchronous sockets layer. Netbios schedules the asynchronous receive requests, described below, on behalf of SMBparser. For example, SMBs are packaged in Netbios packets and Netbios makes the asynchronous socket calls on behalf of the SMBparser layer, which performs the work.

Async sockets I/O layer 216 provides the low level socket communications that maintain the thread pools used in processing client requests. In one example, the Asynchronous sockets layer uses the POSIX (Portable Operating System Interface for Computer Environments) Asynchronous I/O interface to handle communications.

In one aspect of the present invention, quick replies are used to enable a reply to a request be sent, prior to the receiver (e.g., a server) receiving the entire request from a sender (e.g., a client). Further, in another example, quick replies are used to send a reply to a request (either a partially or fully received request), prior to providing the request to a file system that is to process the request (e.g., write the data of the request to disk). In another aspect of the present invention, data movement within the server is eliminated or at the very least reduced, when transmitting data between the file system associated with the server and a transmission medium (e.g., a wire) between the server and the client, by bypassing non-file system buffers during the transmission. These aspects of the present invention, as well as others, are described in detail with reference to the overview logic depicted in FIGS. 3a-3d. (These figures depict only one example. Various modifications, additions and deletions can be made without departing from the spirit of the present invention. Additionally, although this example is described with reference to a server and a client, the invention is not limited to the same.)

Figure 3A:
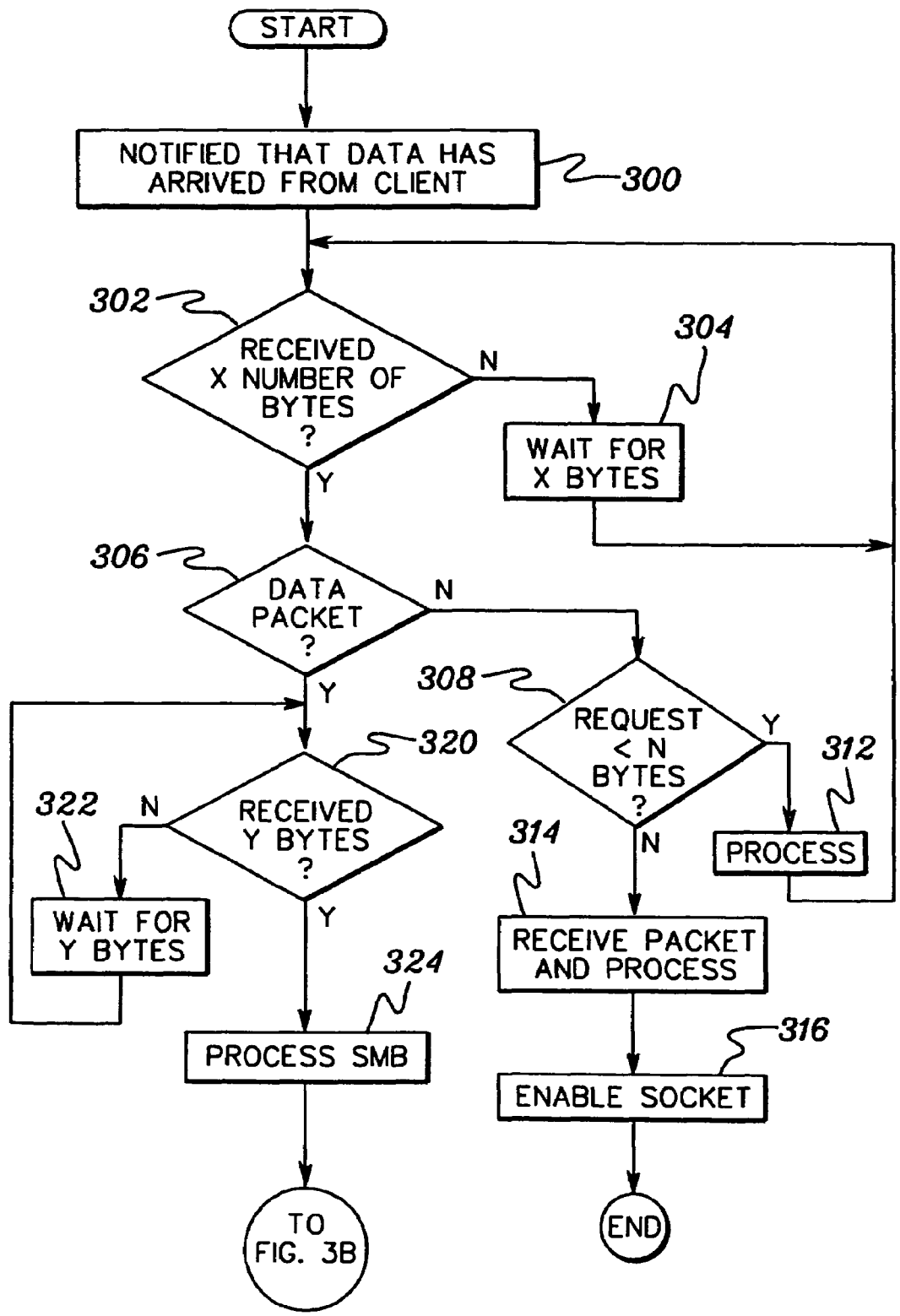
FIGS. 3a-3d depict one embodiment of the logic associated with processing requests, in accordance with the principles of the present invention.

Referring to FIG. 3a, at some point in time, the server is notified by POSIX Asynchronous I/O Services that information (e.g., a new request) has arrived from a client, STEP 300. This information is transmitted, for instance, in a packet. However, in accordance with one aspect of the present invention, only a portion of the packet is received by the lowest communications layers of the server (e.g., Async Sockets I/O and Netbios). For example, Netbios receives 12 bytes of information: 4 bytes are the Netbios header and 8 bytes are the beginning of a Server Message Block (SMB) packet (i.e., an SMB header). Netbios strips off the Netbios header and passes the request onto a processing thread to handle the SMB packet. In particular, Netbios notifies SMBparser that a new request has arrived. This allows SMBparser to control when the packet is fully consumed from the transmission medium, when a reply is sent for the SMB, and when the client session should be enabled to receive the next packet.

Since SMBparser is notified when at least one byte of data has been received, the server initially ensures that at least the Netbios header has been received before continuing processing. Thus, a determination is made as to whether a predefined number of bytes (X) has been received, INQUIRY 302. In this example, a determination is made as to whether 4 bytes of data, representing the Netbios header, have been received. If it is determined that the Netbios header has not been received, then the server waits until the predetermined number of bytes have been received via a synchronous read call, STEP 304, and processing continues with INQUIRY 302.

On the other hand, when the predefined number of bytes have been received, then a further determination is made as to whether the request represents a data packet (e.g., an SMB packet), INQUIRY 306. This is determined by examining the Netbios header. If the request is not a data packet and is instead, for example, a Netbios packet, then another determination is made as to whether the request is less than N bytes, where N is equal to 12, in this example, INQUIRY 308.

If the request is less than N bytes, then the request (which is equal to 4 bytes in this example) is processed, STEP 312, and flow returns to INQUIRY 302 with the remaining bytes (e.g., 8 bytes) to be processed. However, if the request is greater than N bytes, then the rest of the packet is received and processed, STEP 314. Thereafter, the socket is enabled to receive the next request asynchronously, STEP 316. In one example, the socket is enabled by issuing an asynchronous receive function that allows notification of when a client request arrives at the server. Processing is then complete for this request and thus, this thread becomes available for another request.

Returning to INQUIRY 306, if the received packet is a data request, then a determination is made as to whether a predetermined number of bytes (e.g., Y=8) of the SMB has been received, INQUIRY 320. If the first 8 bytes of the SMB header, in this example, have not been received, then the server waits for those bytes, STEP 322, and processing continues with STEP 320. On the other hand, if the predetermined number of bytes has been received, then the SMBparser layer is called to process the SMB, STEP 324. For example, the address of the predetermined number of bytes is passed to SMBparser with the socket in a stopped state. Since the socket is in the stopped state, no more information will be examined on the socket until specifically requested by the SMBparser layer.

Figure 3B:
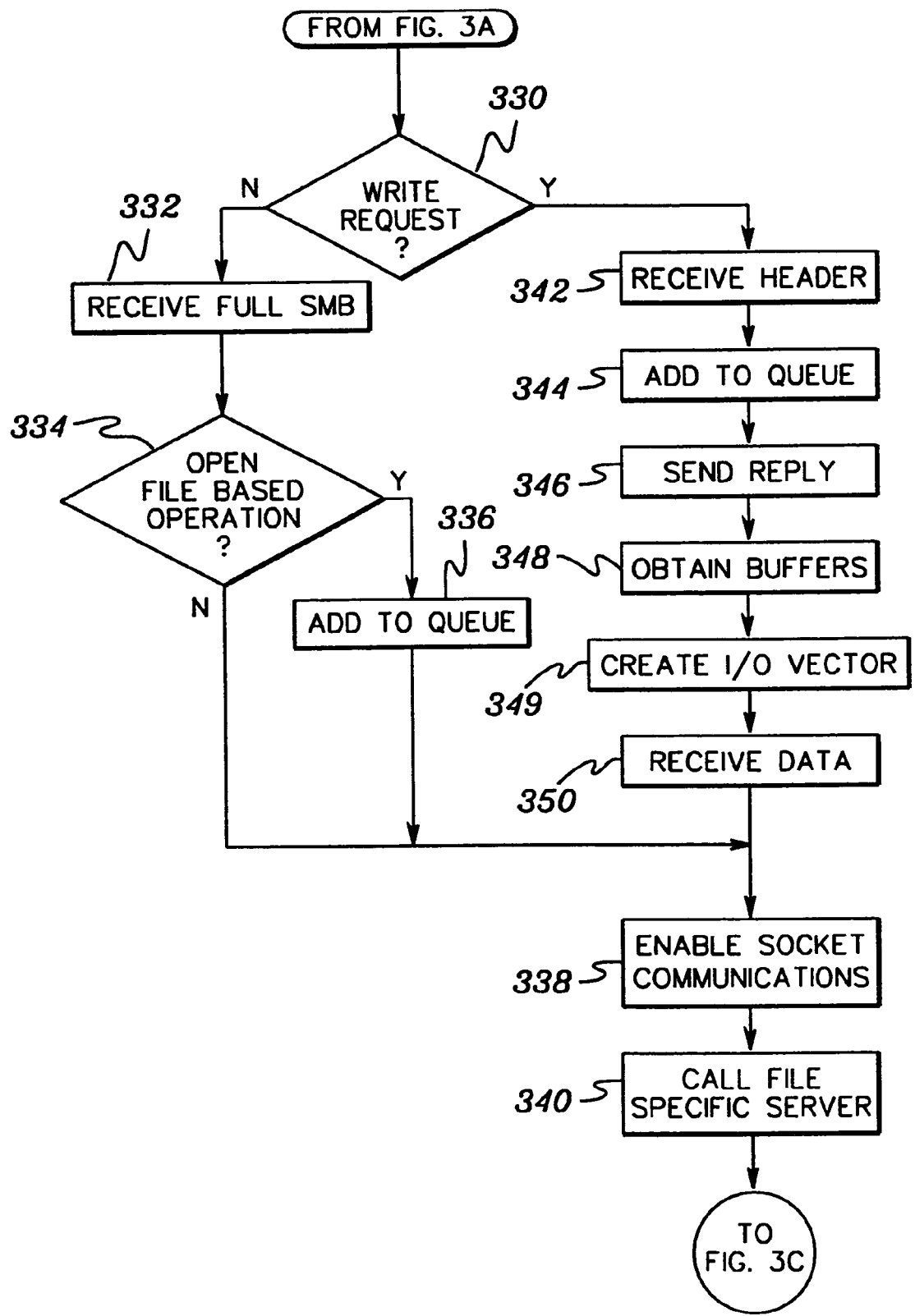

One embodiment of the logic associated with processing the SMB is described with reference to FIG. 3b. Initially, the SMBparser layer examines the type of packet to determine whether the packet represents a write request or some other type of request, STEP 330 (FIG. 3b). In one example, this determination is made by examining the SMB header of the request. If the request is not a write request, then the rest of the SMB is received from the client over the transmission medium via a synchronous TCP/IP receive function, STEP 332.

Figure 4:
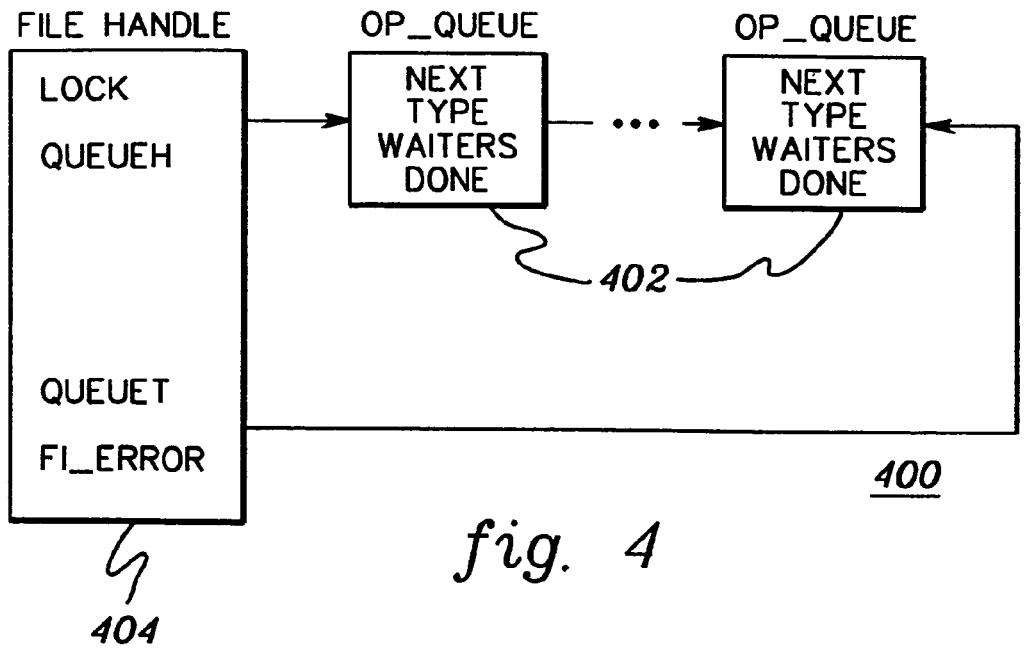
FIG. 4 depicts one example of a data structure used in accordance with the principles of the present invention.

Subsequently, a determination is made as to whether the request is an open file based operation, INQUIRY 334. If it is an open file based operation, then the request is added to a data structure to ensure the request is processed in proper order, as explained below, STEP 336. One example of such a data structure is described with reference to FIG. 4.

In one embodiment, a data structure 400 is a linked list (e.g., singly or doubly linked) representation of a queue having one or more op_queue structures 402 and a file handle 404. Each op_queue structure represents a pending operation, and includes a plurality of fields, such as the following: a next field indicating the next request on the queue; a type field indicating whether the operation is a read operation, a write operation, or another type of operation; a waiters field indicating if threads are waiting for the request to finish; and a done field which is a flag that indicates if the operation has completed its file system calls.

File handle 404 represents a file that is opened for a particular client. The file handle includes various fields, including, for instance, the following: a lock field (fi-lock) which is used for serialization; a queueH field that points to the head of data structure 400 (e.g., the queue); a queueT field that indicates the tail of the data structure; and an error field (fi_error) that indicates the most recent error found when processing the file.

Figure 5:
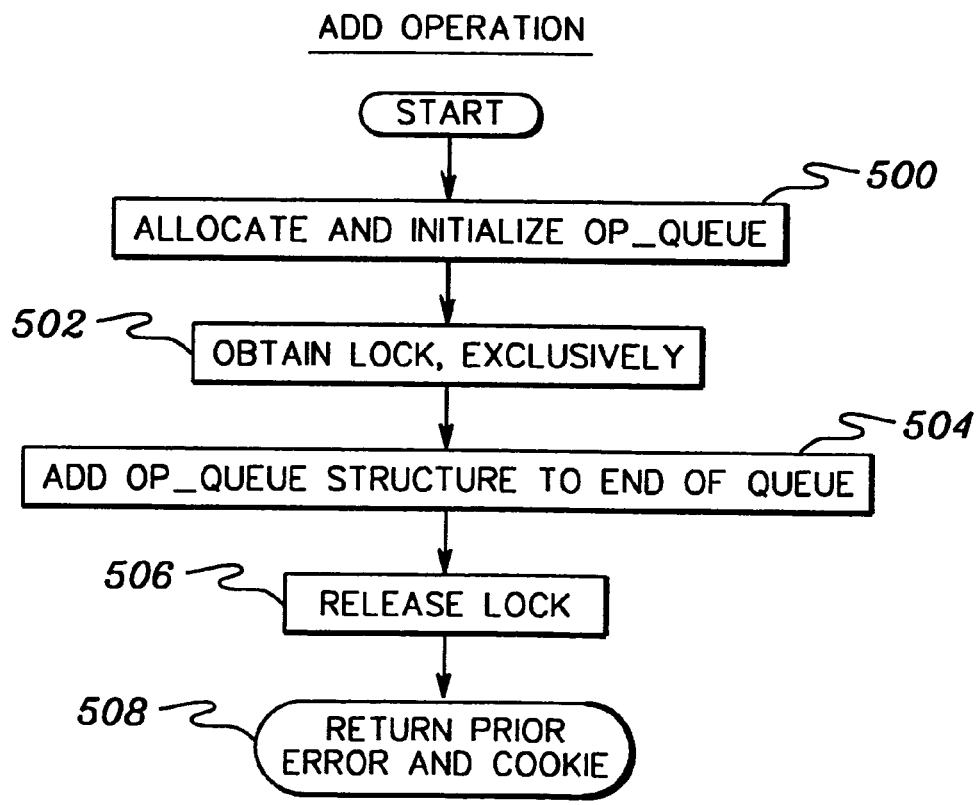
FIG. 5 depicts one embodiment of the logic associated with adding an operation to the data structure of FIG. 4, in accordance with the principles of the present invention.

One embodiment of the logic associated with adding a file operation to the queue is described with reference to FIG. 5. In one example, an add routine (e.g., addNewFileOp(int type, int *preverror, op_queue *cookie)) is used to add a file operation to the queue, return any prior error (preverror) from any previous operation, and return a cookie which can be used for future calls. In one example, the cookie is the address of the associated op_queue structure. The routine is called when a new operation is received by SMBparser, but before a reply is sent to the client. It establishes the position of the file operation in the queue, but it does not block the service thread of the request.

The add routine receives as input the type of the request and proceeds to allocate and initialize an op_queue structure, STEP 500. As part of the initialization, the type of the request is saved in the op_queue, the rest of fields are cleared, and the cookie is set equal to the address of the op_queue.

Thereafter, the file lock of the file handle is obtained exclusively, so that the data structure is not updated by another function during the add operation, STEP 502. Subsequently, the op_queue structure is added to the end of the data structure queue and QueueT of the file handle is updated, STEP 504. The exclusive lock is then released, STEP 506, and any prior error and the cookie are returned to SMBparser, STEP 508. This concludes the adding of an operation to the queue.

Returning to FIG. 3b, subsequent to adding the file operation to the file operation queue, STEP 336, socket communications is enabled for the next SMB, STEP 338. In one example, a POSIX asynchronous I/O receive function is used to enable the communications. Additionally, the file specific server is called to perform any additional processing and to make appropriate calls to the physical file system, as described below, STEP 340.

Returning to INQUIRY 330, if the request is a write request (e.g., a write or writeraw request), then the rest of the SMB header is received via the synchronous TCP/IP receive function (size of header is known), STEP 342. At this point, no user data has been received for the write operation.

Thereafter, the write file operation is added to the file operation queue in the manner described above, STEP 344, and a reply is sent back to the client via a synchronous TCP/IP writev function, STEP 346. In one example, this reply is a quick reply sent prior to receiving the entire packet.

Additionally, the server (e.g., SMBparser) gets ready to receive the data in the physical file system. In one example, this includes having SMBparser obtain one or more physical file system buffers, based on the offset/length information in the SMB, STEP 348. In one instance, the buffers are correlated to pages (each page includes, for example, 4096 bytes) and are thus, obtained using a pfs_allocate page routine. In other embodiments, the buffers do not correlate to pages, but instead, represent some other amount of memory.

Figure 6:
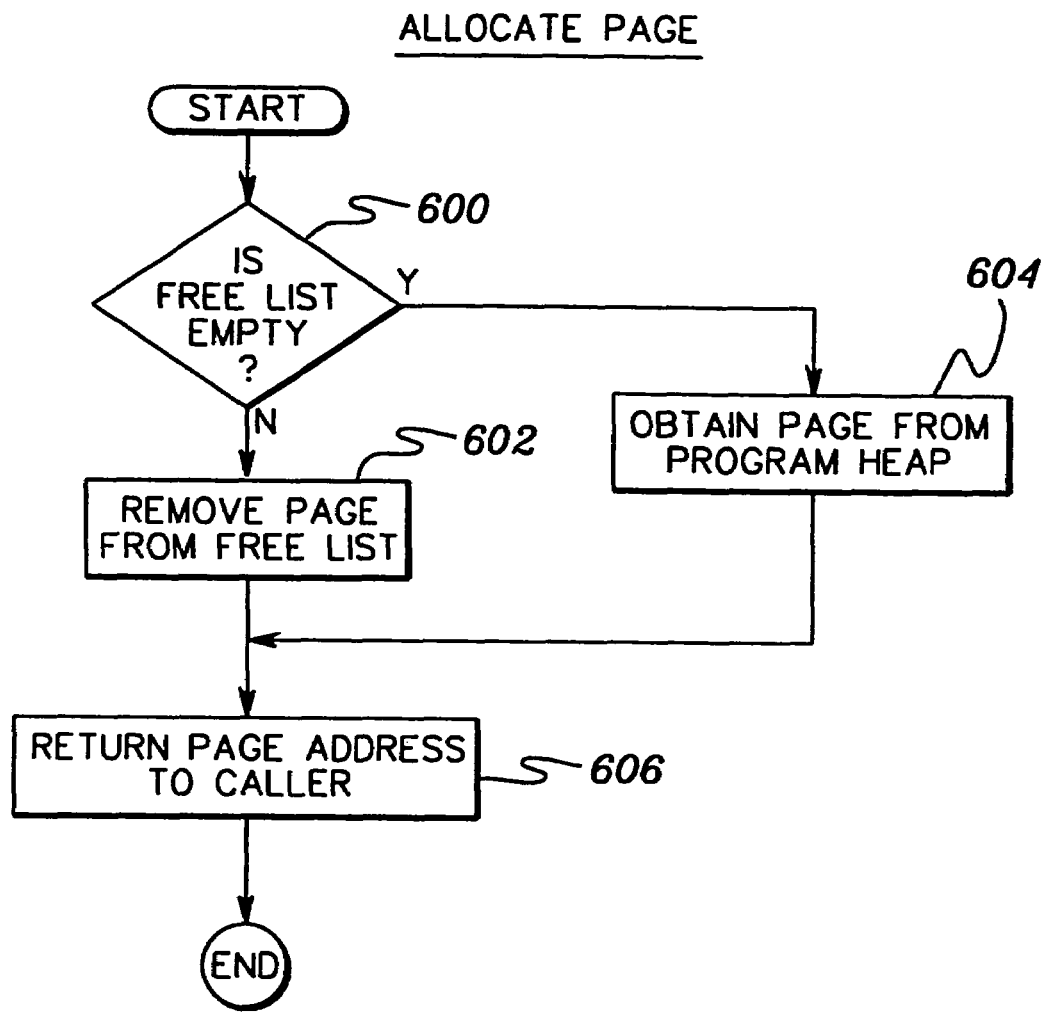
FIG. 6 depicts one embodiment of the logic associated with allocating a buffer, in accordance with the principles of the present invention.

One embodiment of the logic associated with an allocate page routine is described with reference to FIG. 6. Initially, a determination is made as to whether a free list indicating a list of free pages is empty, INQUIRY 600. If the free list is not empty, then a page is obtained from the list, STEP 602. Otherwise, a page is obtained from the program heap, STEP 604. Subsequent to obtaining a page, the page address is returned to the caller, STEP 606. This page address represents the address of the buffer to hold the data.

Figure 7A:
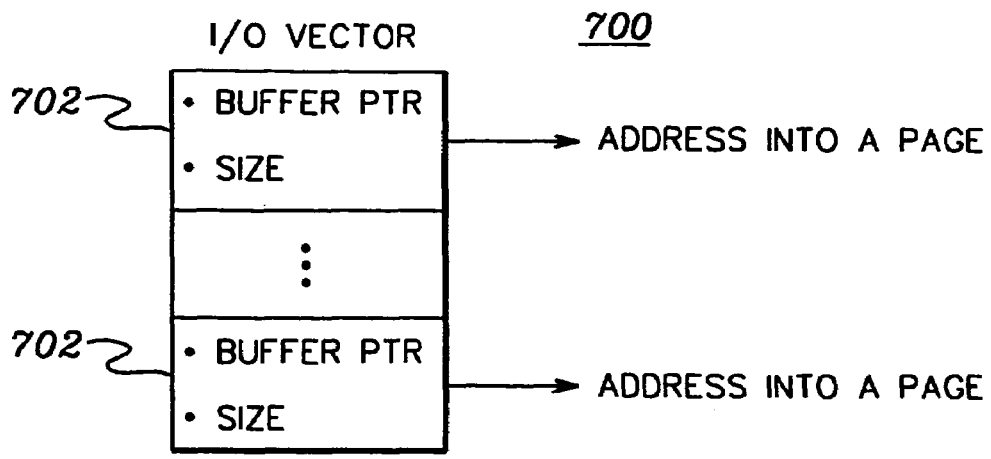
FIG. 7a depicts one example of an I/O vector used in accordance with the principles of the present invention.

Returning to FIG. 3b, in addition to obtaining the buffers for the data, an I/O vector is created for page aligned data, STEP 349. One embodiment of such an I/O vector is described with reference to FIG. 7a.

An I/O vector 700 is, in one instance, an array having one or more elements 702. Each element includes, for example, a buffer pointer indicating the start of a buffer (e.g., an address into or the start of a page of memory), and a size reflecting the size of the buffer. The I/O vector is created and initialized based on the buffers obtained in STEP 348.

Figure 7B:
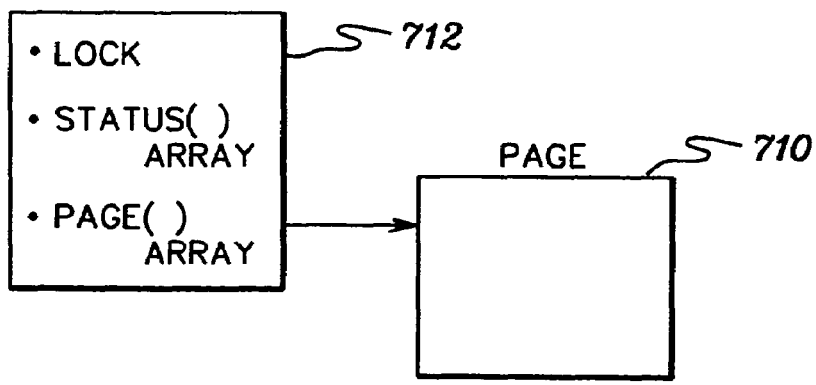
FIG. 7b depicts one example of a segment referencing a page, in accordance with the principles of the present invention.

The buffers are in the physical file system cache and, in this instance, are made up of one or more pages of memory. A page 710 (FIG. 7b) in the physical file system cache is pointed to by a data structure, referred to as a segment 712.

Each segment has an array of page pointers (e.g., 16 pointers) used to locate one or more pages. The segment also has a status array used to indicate the status of a corresponding page, and a lock for serialization purposes.

Figure 7C:
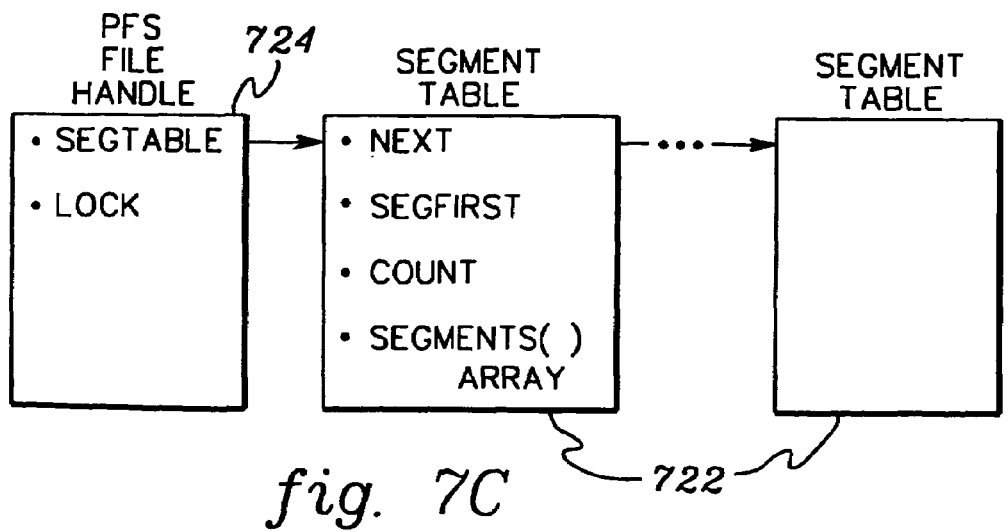
FIG. 7c depicts one example of a segment table used in accordance with the principles of the present invention.

Segments are located using segment tables 722 (FIG. 7c). Each segment table has a number of fields including, for instance, a next field indicating the next segment table; a segfirst field indicating the segment number of the first segment of that segment table; a count field indicating the number of segments of the segment table; and a segment array including pointers to the one or more segments of the segment table.

The list of one or more segment tables is referenced by a segtable field of a physical file system file handle 724. The file handle also includes a lock, which is used for serialization.

Returning to FIG. 3b, after creating the I/O vector, STEP 349, the data is received via, for instance, the SMB packet, STEP 350. For writeraw operations, more user data will flow from the client and that data is also received at the server at the same time. In accordance with one aspect of the present invention, the data is read directly into the PFS cache compatible buffers at page aligned offsets. That is, other buffers within the server are bypassed when receiving the data over the transmission medium, as described in more detail below.

In addition to receiving the data, the socket communications for the next SMB is enabled via an asynchronous receive call, STEP 338. This starts the socket session with the client which means the server will be notified when the next SMB request from the client is received (which could be dispatched and processed in parallel with the thread that is processing the SMB_write or SMB_writeraw request).

Sending the reply before receiving the rest of the data can greatly reduce the time before the next client request is received by the server because the client reply is on its way before the original packet is received, and for file writes that packet can be large (e.g., 64k for SMB/CIFS protocol) and take a significant amount of time. Thus, replies are seen sooner by the client, which can then send the next data sooner and hence, data is sent to the server faster. Therefore, the communications time (the main bottleneck) for file writes is reduced. Additionally, the queueing is performed on a file handle for a specific client, no other client requests are blocked to the file and other requests from the same client that affect other files or directories are not blocked by the file queueing capabilities described herein allowing for maximum parallelism. The file handle is created when the file is opened (e.g., via an SMB_open operation) and destroyed when the file is closed (e.g., via an SMB_close operation).

Subsequent to enabling the socket communications, the file specific server is called to perform any additional processing and to make appropriate calls to the physical file system, STEP 340.

Figure 3C:
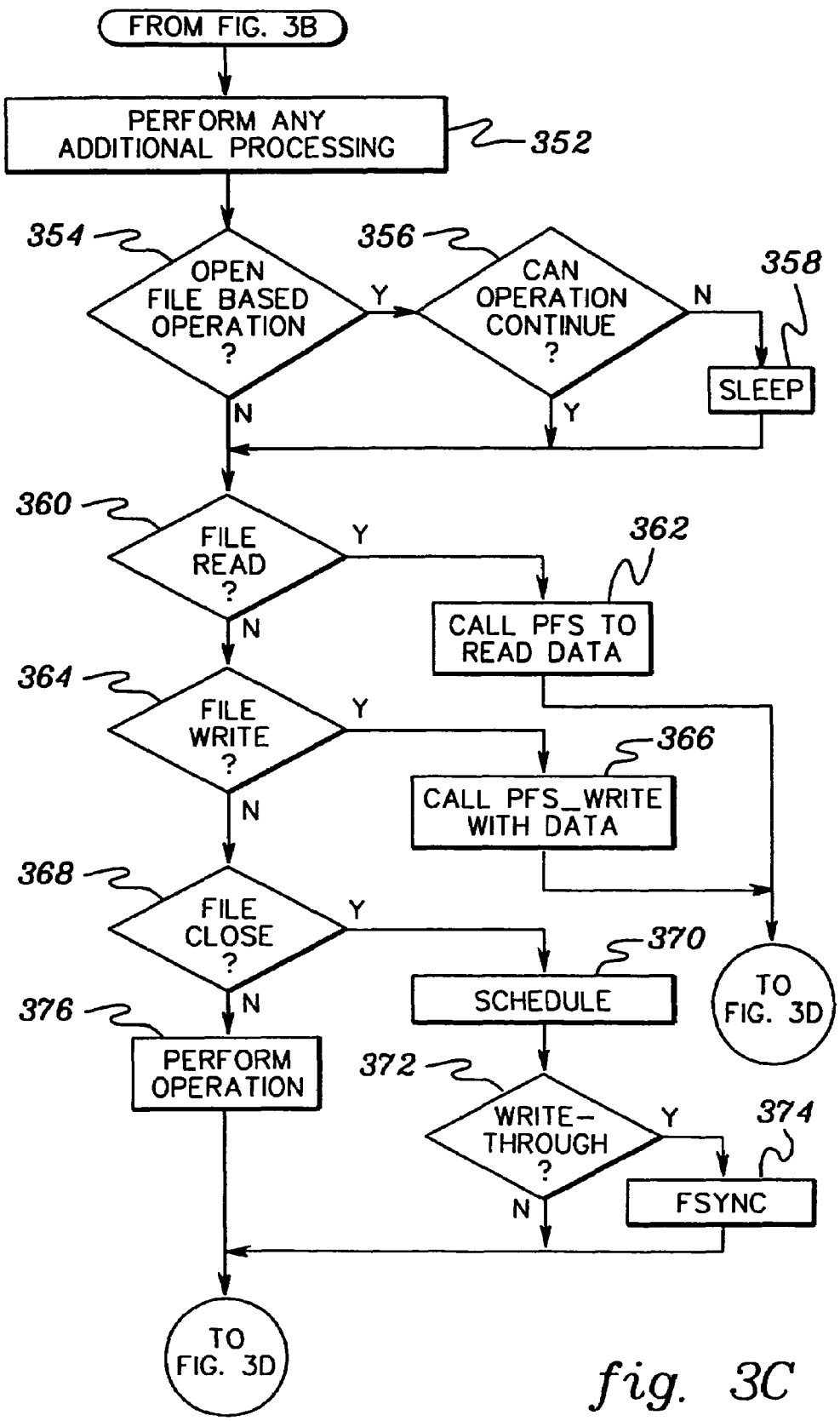

One embodiment of the processing associated with the file specific server and the physical file system is described with reference to FIG. 3c. As an example, when the file specific server is called, the file specific server performs any additional processing that needs or is desired to be performed, STEP 352. In one example, for OS/390 DFS, this includes token management and error checking. The quick reply aspect of the present invention allows this processing to be performed in parallel, if two or more client file operations for the same file have arrived at the server.

Thereafter, a determination is made as to whether this is an open file based operation, INQUIRY 354. If this is an open file based operation, a further inquiry is made as to whether the operation can continue, INQUIRY 356. As one example, the operation can continue if there are no operations in progress before it that block the operation. This determination is made, for instance, by a start file operation. The start file operation is called before the physical file system is called for a particular operation. It is the routine that blocks the thread, if it is not next in the list of requests allowed to be processed by the physical file system.

In particular, the start file operation examines the file handle to see if the request is allowed to progress. For a write operation, it will progress if it is the next unprocessed request in the queue. For a read operation, it will progress if it is before a write operation. Read type request are allowed in parallel, so many read requests are allowed in parallel, if there are no unfinished write requests ahead of them in the queue. Thus, before the physical file system is called, a permission to call PFS function is called which checks to see if the thread is processing a request which is next in-line or one that is to wait its turn (in proper client receipt order). This allows two or more SMB requests that pertain to the same file to be processed in parallel, except for the actual physical file system call. Thus, parallel processing is not reduced.

Figure 8:
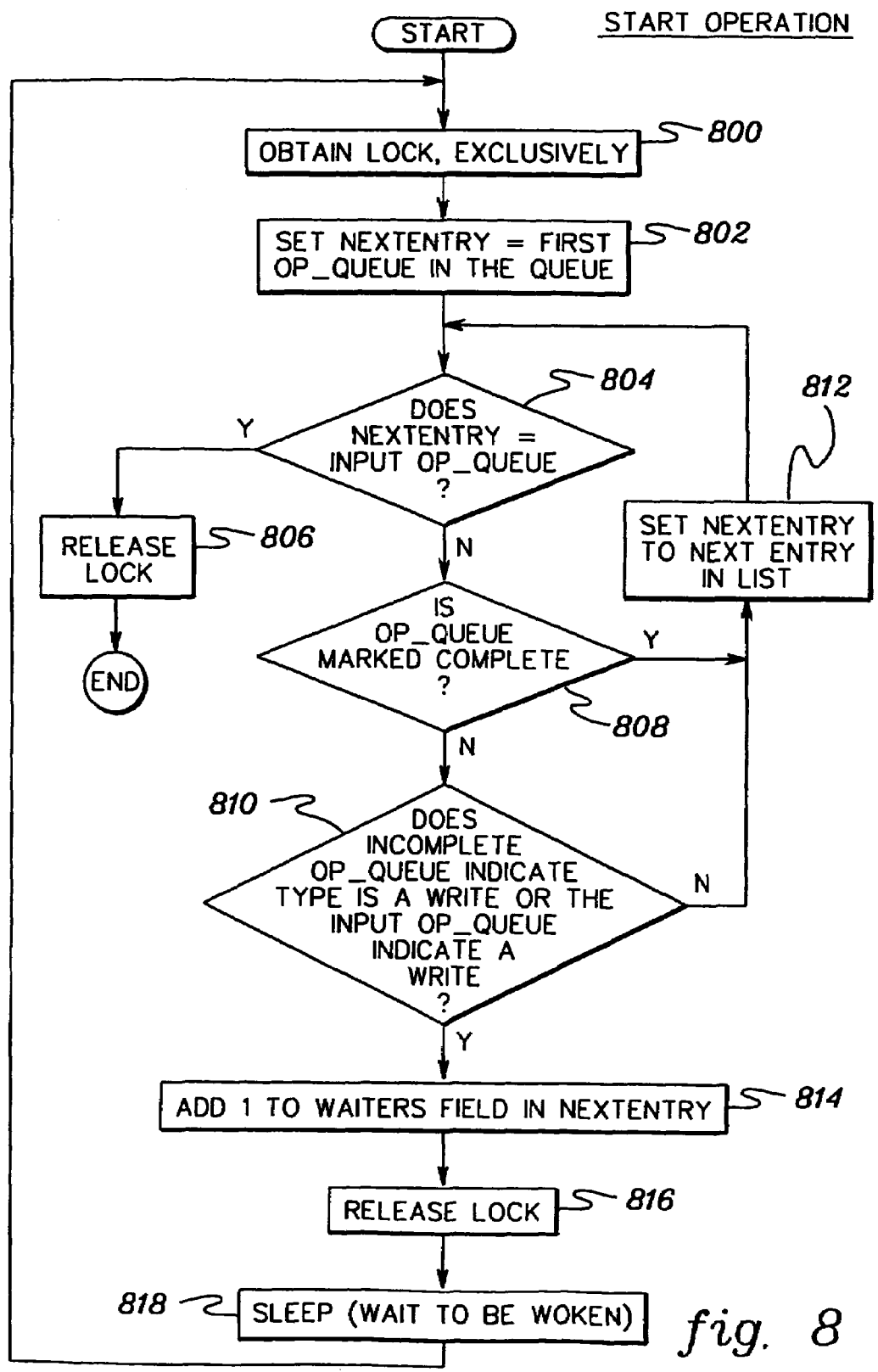
FIG. 8 depicts one embodiment of the logic associated with determining if a particular file operation can be performed, in accordance with the principles of the present invention.

One embodiment of a start file operation is described with reference to FIG. 8. The start file operation receives as input a cookie, which identifies the address of the op_queue associated with this request. Initially, the lock of the file handle corresponding to the input op_queue is obtained exclusively in order to prevent other updates to the queue during this processing, STEP 800. Thereafter, a variable referred to as nextEntry is set equal to the first op_queue in the queue, STEP 802.

A determination is then made as to whether nextEntry is equal to the input op_queue, INQUIRY 804. If it is equal, then the lock is released, STEP 806, and the start operation is complete. This indicates that there are no operations in progress before this request that can block the operation.

On the other hand, if the nextEntry is not equal to the input op_queue, INQUIRY 804, then a further determination is made as to whether the op_queue (represented in nextEntry) is marked as complete, INQUIRY 808. If the op_queue is not marked as complete, then yet another determination is made as to whether the incomplete op_queue indicates the type is a write operation or whether the input op_queue indicates a write operation, INQUIRY 810. If neither the incomplete op_queue or the input op_queue indicates a write, or if the op_queue is marked as complete, then nextEntry is set equal to the next entry in the list, STEP 812. Processing then continues with INQUIRY 804.

However, if either the incomplete op_queue or the input op_queue indicates a write operation, then the waiters field in nextEntry (i.e., the prior blocking op_queue, not the input op_queue) is incremented by one, STEP 814. Thereafter, the lock is released, STEP 816, and the operation is put to sleep, waiting to be awoken, STEP 818.

Thus, the start operation makes the thread wait until there are no more operations in the queue ahead of it that are marked incomplete and not incompatible with the type (reads are compatible with reads, writes are compatible with nothing). When the routine returns, the thread is next in line to make the physical file system call. Thus, if there are blockers, the thread is put to sleep until blocking operations are complete. Then, processing continues with STEP 800.

Returning to FIG. 3c, and in particular, to INQUIRY 356, if the operation cannot continue, then the thread is put to sleep as indicated above, STEP 358, and sleeps until it is awoken. Additionally, a prior write error is returned, if any.

When the operation can continue, then a determination is made as to whether the file operation is a read operation, INQUIRY 360. This is determined by the type field in the op_queue. If it is a read operation, then the physical file system is called to read the file data. In one example, a pfs_read routine (file_handle *fh, int offset, int size, int *resid, . . . void (*copyrtn)( ), int cookie) is used to read the data. Input to the pfs_read routine is a callback function address, a file offset, and an amount of data to be read. The callback function sends data directly over the transmission medium from the physical file system buffers to the requester of the data. Thus, additional buffers within the server are bypassed, when transmitting data from the physical file system to the transmission medium. The physical file system calls the callback function with the addresses of the pfs cache buffers that contain the data, when data is in its buffers. One example of a physical file system read function is described with reference to FIGS. 9a-9b.

Figure 9A:
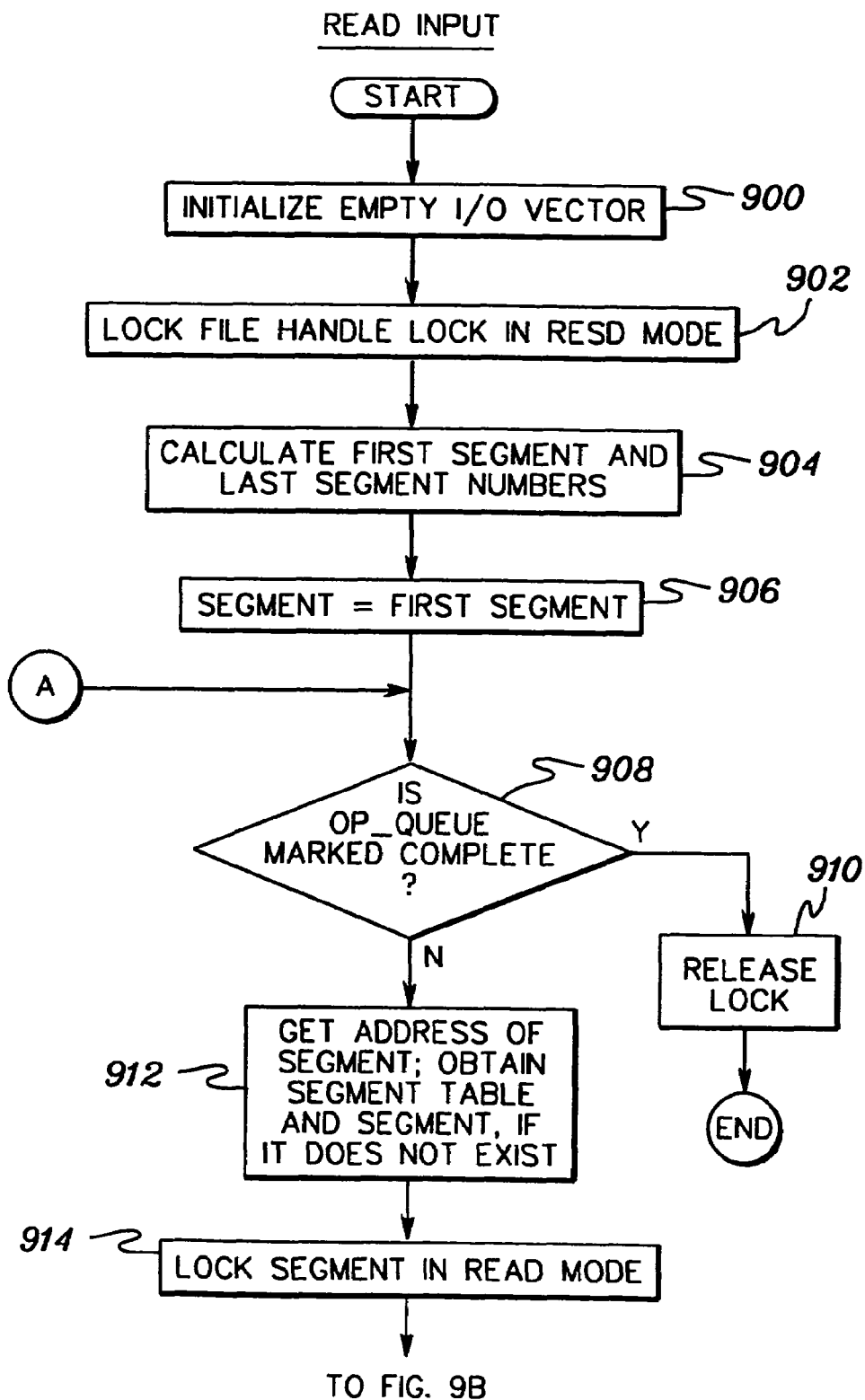
FIGS. 9a-9b depict one embodiment of the logic associated with a read operation, in accordance with the principles of the present invention.

Referring to FIG. 9a, initially, an empty I/O vector is initialized, STEP 900. This vector is initialized to include pointers to any buffers used by the physical file system to hold the data that is to be transmitted over the transmission medium to the client issuing the request. Additionally, the lock in the physical file system file handle is locked in read mode in order to obtain information from the segment table, STEP 902.

Thereafter, the first segment and last segment numbers affected by the read operation are calculated, STEP 904, and a variable referred to as segment is set equal to the first segment, STEP 906.

Next, a determination is made as to whether the variable referred to as segment is greater than the last segment, INQUIRY 908. If segment is greater than the last segment, then no further segments need to be processed, and the lock in the pfs file handle is released, STEP 910.

However, if segment is not greater than the last segment, then the address of the segment is obtained based upon the segment number and segment table. Further, the segment table and segment are obtained, if they do not exist in memory, STEP 912.

Figure 9B:
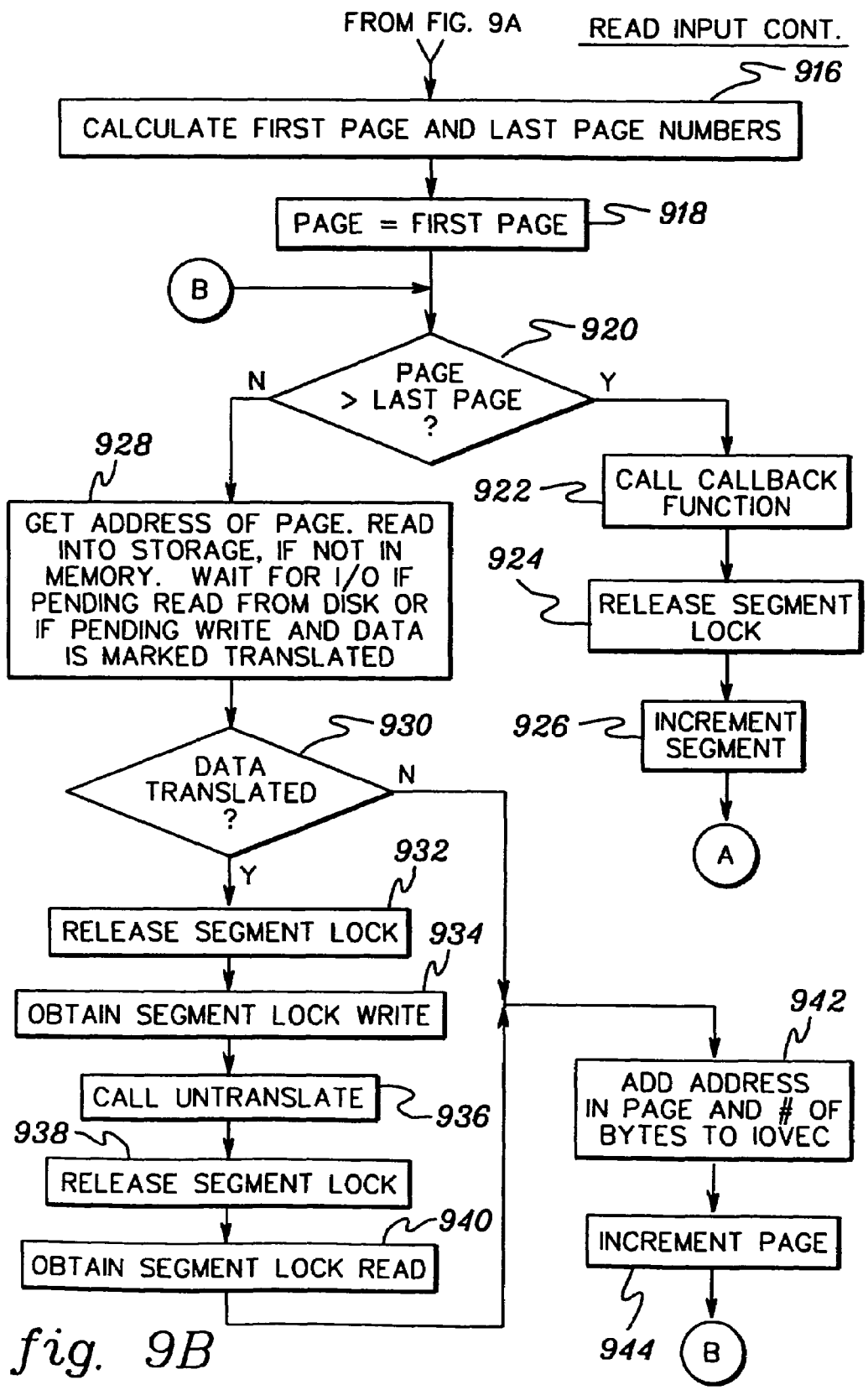

Thereafter, the lock field in the segment structure is set to read mode, STEP 914. After setting the lock in read mode, the first page and last page numbers affected by the read operation are calculated, STEP 916 (FIG. 9b). Additionally, a variable referred to as page is set equal to the first page, STEP 918.

Subsequently, a determination is made as to whether page is greater than last page, INQUIRY 920. Should page be greater than last page, then the callback function is called, STEP 922. In particular, the callback function is called with an I/O vector address and an indication if it will be the last time the function is to be called or an error occurs.

Subsequently, the segment lock is released, STEP 924, and the variable referred to as segment is incremented by one, STEP 926. Processing then continues with INQUIRY 908.

Returning to INQUIRY 920, if the variable referred to as page is not greater than the last page, then the address of the page is obtained based on the segment and page number, STEP 928. Additionally, the page or pages are read into storage, if they are not in memory. Further, there is a wait for I/O, if there is a pending read from disk or if the page is pending write to disk and the data is marked as translated, STEP 928.

Subsequently, a determination is made as to whether the file system indicated data is translated, INQUIRY 930. In one example, this determination is made by checking a bit mask to see if the buffer is translated. If the data is indicated as translated, then the segment lock is released, STEP 932, and the segment lock is then obtained in write mode, STEP 934. Additionally, an untranslate function is called to untranslate the data, STEP 936. In accordance with one aspect of the present invention, the data translation (or untranslation) is handled internally in the physical file system in order to reduce data movement. In particular, the data is translated directly in the physical file system cache buffers. The data in the buffers are translated before calling the callback function.

After translating the data into the format of the client (e.g., into EBCDIC or ASCII), the segment lock is released, STEP 938, and the segment lock is then obtained in read mode, STEP 940.

Thereafter, or if the data is not translated, INQUIRY 930, then the address of the first byte in the page covered by the I/O operation is added to the I/O vector, along with the number of bytes covered by the I/O operation, STEP 942. Additionally, the variable referred to as page is incremented by one, STEP 944. Processing then continues with INQUIRY 920.

Returning to FIG. 3c, and in particular, to INQUIRY 360, if the request is not a read operation, then a further determination is made as to whether the operation is a file write operation, INQUIRY 364. If it is a write operation, then a pfs_write routine is called with the data, which is in the physical file system compatible buffers. The physical file system performs buffer swapping whenever possible, directly updating the caller's I/O vector with old buffers used for the file.

A pfs_write routine (file_handle *fh, int offset, int size, struct iovec *iov, int iovcnt, . . . , int flag) receives as input an I/O vector of buffer addresses, a file handle, an amount of bytes of data to write, as well as a flag indicating if the incoming data is in physical file system compatible buffers. If the flag indicates compatible buffers, then the physical file system swaps its own internal buffers with the caller's buffers. The IOV field points to a vector of buffer addresses and lengths (the buffers need not be contiguous). An IOV count indicates how many buffers are provided. However, if a write is not on a buffer boundary (i.e., the offset is not evenly divisible by the buffer size, then some copying in the first and last buffer in the list may be necessary).

By swapping the buffers, data movement is eliminated or at least substantially reduced. For example, when the physical file system is called, it can perform buffer swapping, which usually means less data movement when the file lock is held, which can also reduce lock contention. The physical file system updates the caller's buffer vector with the old pfs cache buffers that the pfs originally held for the file. Then, when SMBparser completes the write request, it frees the buffers; although, the buffers may not be the same as the buffers requested. The cache buffers are written to disk when the physical file system determines it is time or by a later request (such as, for example, an fsync request, described below). By swapping the buffers, rather than reading the data directly from the transmission medium into the physical file systems buffers, an exclusive lock on the file or portion of the file being processed is not held across expensive receives from the transmission medium.

Figure 10A:
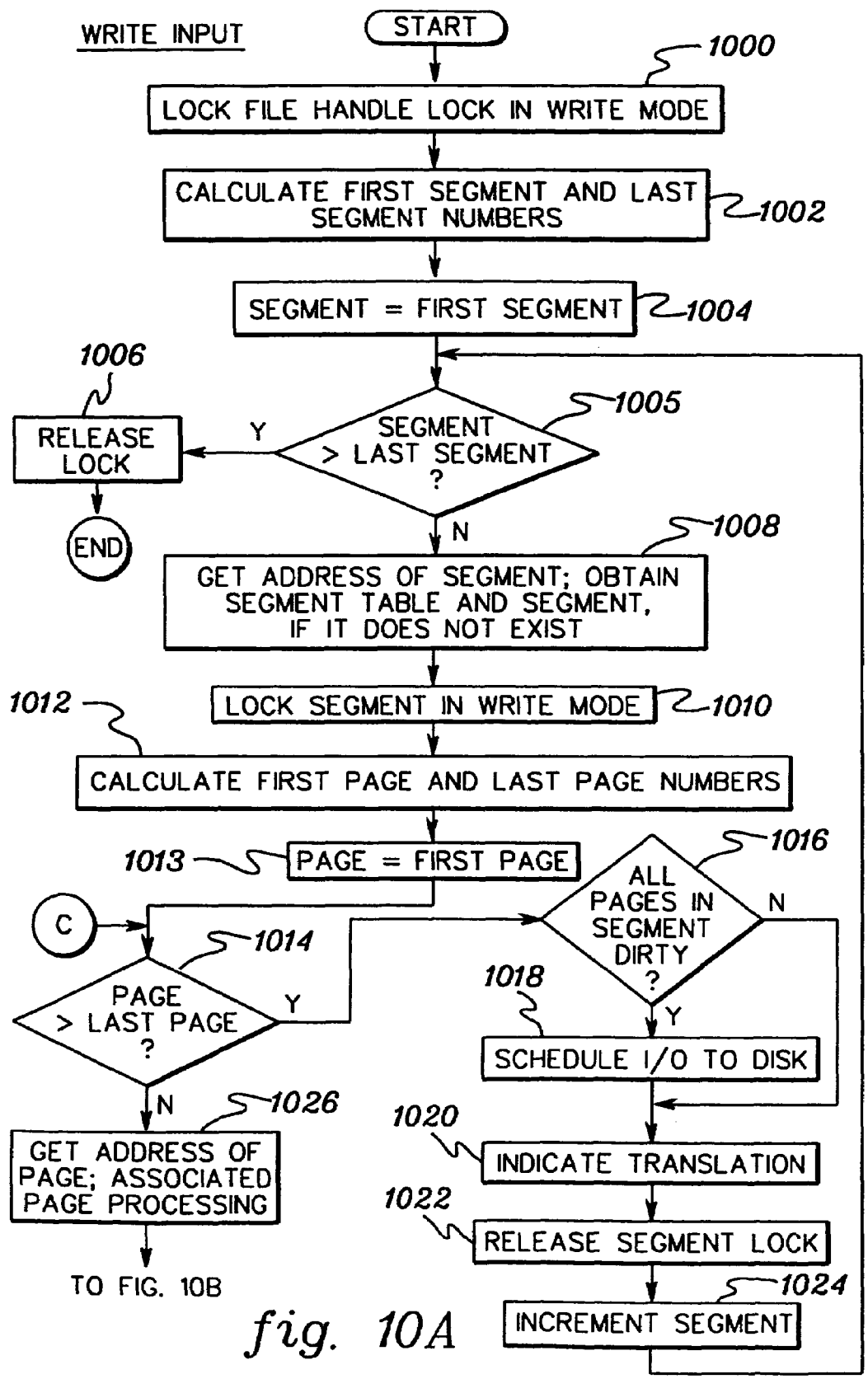
FIGS. 10a-10b depict one embodiment of the logic associated with a write operation, in accordance with the principles of the present invention.
Figure 10B:
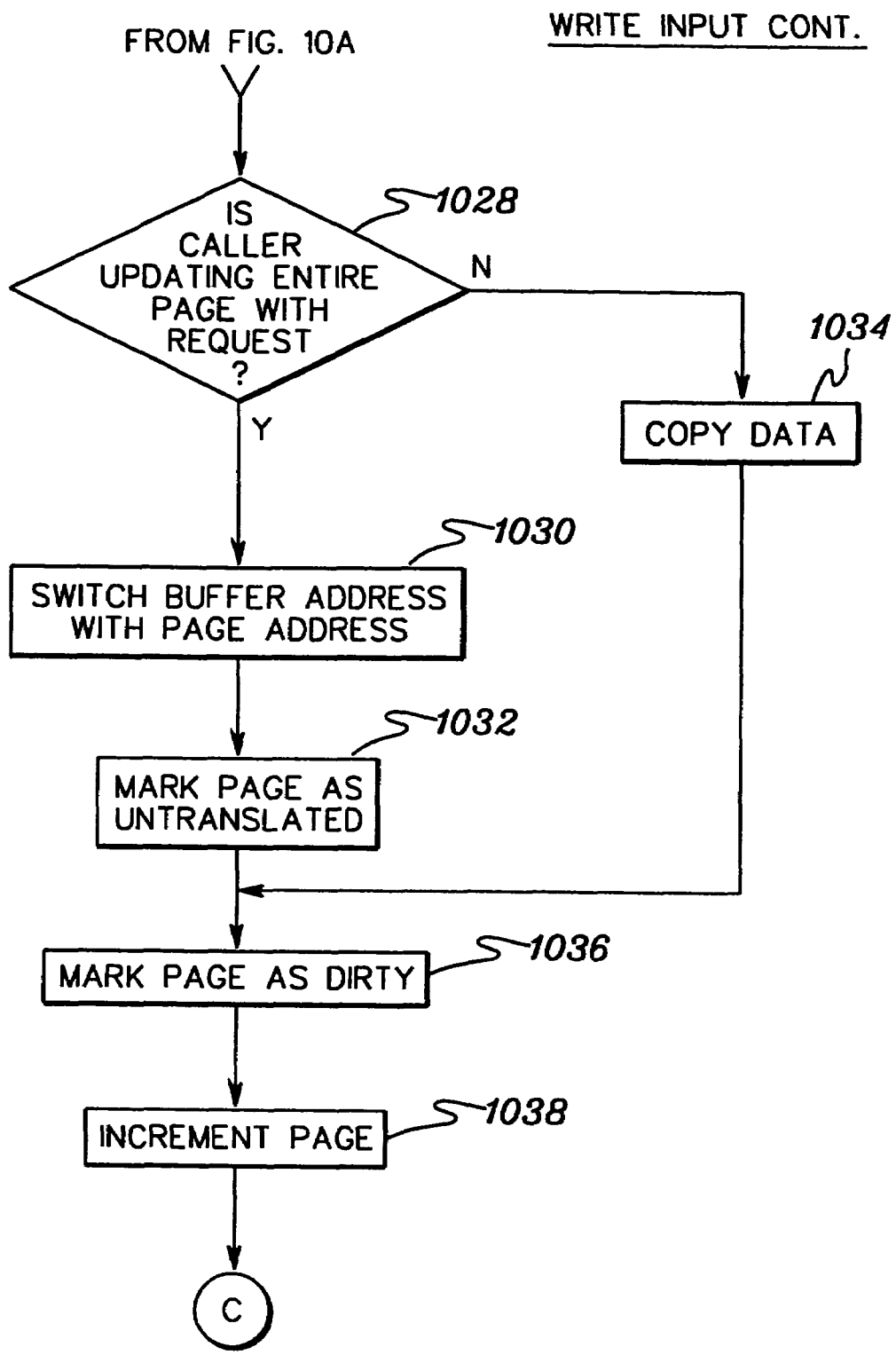

One embodiment of a write routine is described with reference to FIGS. 10a-10b. Initially, the physical file system file handle lock is locked in write mode, STEP 1000. Thereafter, the first segment and last segment numbers affected by the write operation are calculated, STEP 1002, and a variable referred to as segment is set equal to the first segment, STEP 1004.

Next, a determination is made as to whether the variable referred to as segment is greater than the last segment, INQUIRY 1005. If segment is greater than the last segment, then no further segments need to be processed, and the lock in the pfs file handle is released, STEP 1006.

However, if segment is not greater than the last segment, then the address of the segment is obtained based upon the segment number and segment table. Further, the segment table and segment are obtained, if they do not exist in memory, STEP 1008.

Thereafter, the lock field in the segment structure is set to write mode, STEP 1010. After setting the lock in write mode, the first page and last page numbers affected by the write operation are calculated, STEP 1012. Additionally, a variable referred to as page is set equal to the first page, STEP 1013.

Subsequently, a determination is made as to whether page is greater than last page, INQUIRY 1014. Should the page be greater than the last page, then a determination is made as to whether all the pages in the segment are dirty, INQUIRY 1016. If so, then an I/O operation is scheduled to write the data to disk, STEP 1018. Thereafter, or if the data is not dirty, then an indication is made by the file system as to whether the data is translated, STEP 1020. This indication is saved in the status array for the page.

Subsequently, the segment lock is released, STEP 1022, and the variable referred to as segment is incremented by one, STEP 1024. Processing then continues with INQUIRY 1005.

Returning to INQUIRY 1014, if the variable referred to as page is not greater than the last page, then the address of the page is obtained based on the segment and page number, STEP 1026. Additionally, the page or pages are read into storage, if they are not in memory and the whole page is not to be fully updated. Further, there is a wait for I/O, if there is a pending I/O operation, STEP 1026.

Subsequently, a determination is made as to whether the caller is updating the entire page with the request, INQUIRY 1028. If so, then the buffer address in the input I/O vector is switched with the page address, STEP 1030, and the status of the page is marked as untranslated, STEP 1032. Additionally, the status of the page is marked as dirty, STEP 1036, and the variable referred to as page is incremented by one, STEP 1038. Processing then continues with INQUIRY 1014.

Figure 11:
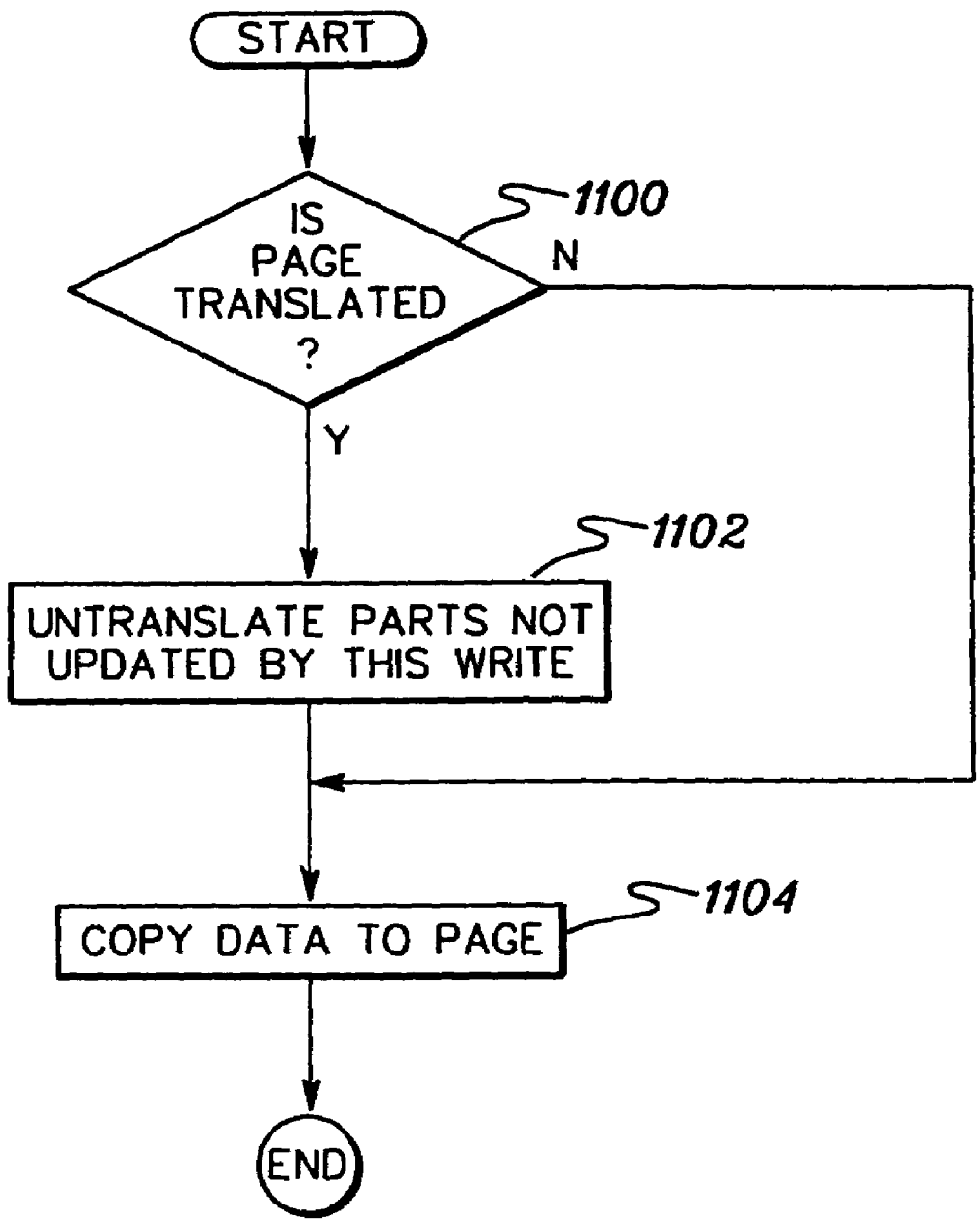
FIG. 11 depicts one embodiment of the logic associated with copying data, in accordance with the principles of the present invention.

Returning to INQUIRY 1028 (FIG. 10b), if the caller is not filling an entire buffer, then data is copied, STEP 1034. In one example, the data is copied using a copy routine, one embodiment of which is described with reference to FIG. 11.

Initially, a determination is made as to whether the page is translated, INQUIRY 1100. This determination is made by checking the status field. If it is translated, then the parts not updated by this write operation are untranslated, STEP 1102.

After translating or if translation is not necessary, then the data is copied to the page, STEP 1104. This completes the copy routine, and processing then continues with STEP 1036 of FIG. 10b.

Returning to FIG. 3c, and in particular, INQUIRY 364, if the request is not a write file operation, then a further determination is made as to whether it is a close operation, INQUIRY 368. If it is a close operation, then it is the last operation to be performed for the file. Thus, all data is written to the pfs by close time and the file close sees any errors that happened after any quick reply of a write request. Thus, an I/O operation is scheduled to write the data to disk, STEP 370. In one example, a pfs_schedule function is called to perform the scheduling. As one example, the scheduling logic loops through all the segments for the file that have dirty pages and schedules an I/O operation for each dirty segment.

Next, a determination is made as to whether write-through is requested, INQUIRY 372. If write-through is requested, then I/O operations are scheduled, as described above; however, processing waits until the I/O operations are complete, STEP 374. If this was not a write-through request, then waiting is not necessary.

Returning to INQUIRY 368, if this is not a close operation, then the physical file system is called to perform the specified operation, STEP 376.

Figure 3D:
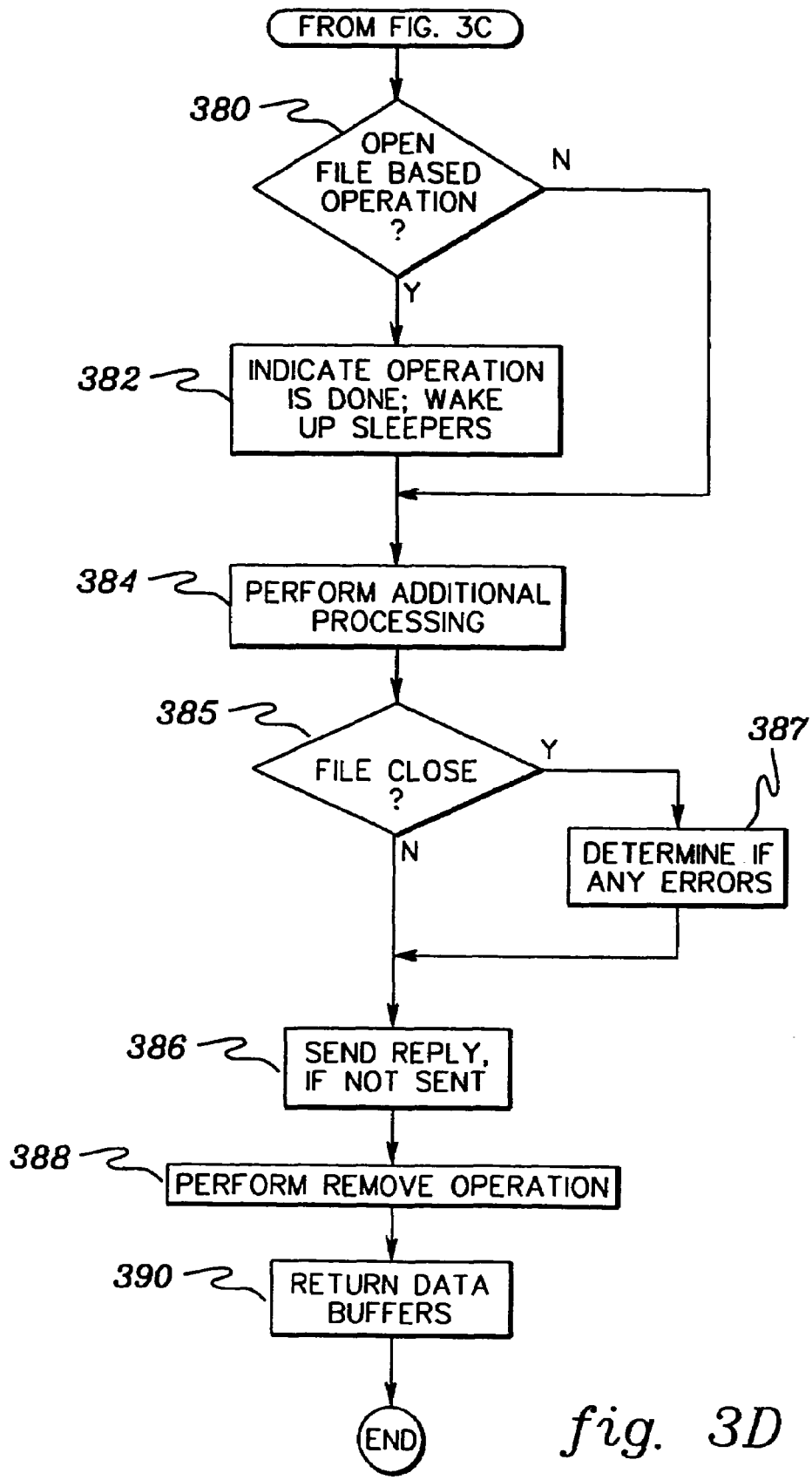

Subsequent to performing the requested operation, STEPs 362, 366, 372, 374 or 376, processing continues with INQUIRY 380 of FIG. 3d. For example, a determination is made as to whether this is an open file based operation, INQUIRY 380. If it is an open file based operation, then an indication is made that the operation is done and any sleepers are awoken, STEP 382. In one example, a stop file routine is used in order to perform this processing. This routine is called after the physical file system is called. It marks the operation as complete, but does not remove it from the queue. It does wake up any waiting threads, so that they can proceed to calling the physical file system on behalf of their operation. It stores the error code (if any), if the physical file system request failed, so other requests can detect the error. This allows prior errors from previous writes to be reflected to later writes, so client applications see the errors, even if the error is for a prior write operation.

One embodiment of the logic associated with the stop file operation is described with reference to FIG. 12. As one example, input to the stop file routine is the cookie having the op_queue address and the error indicator including the error from the physical file system, if any.

Figure 12:
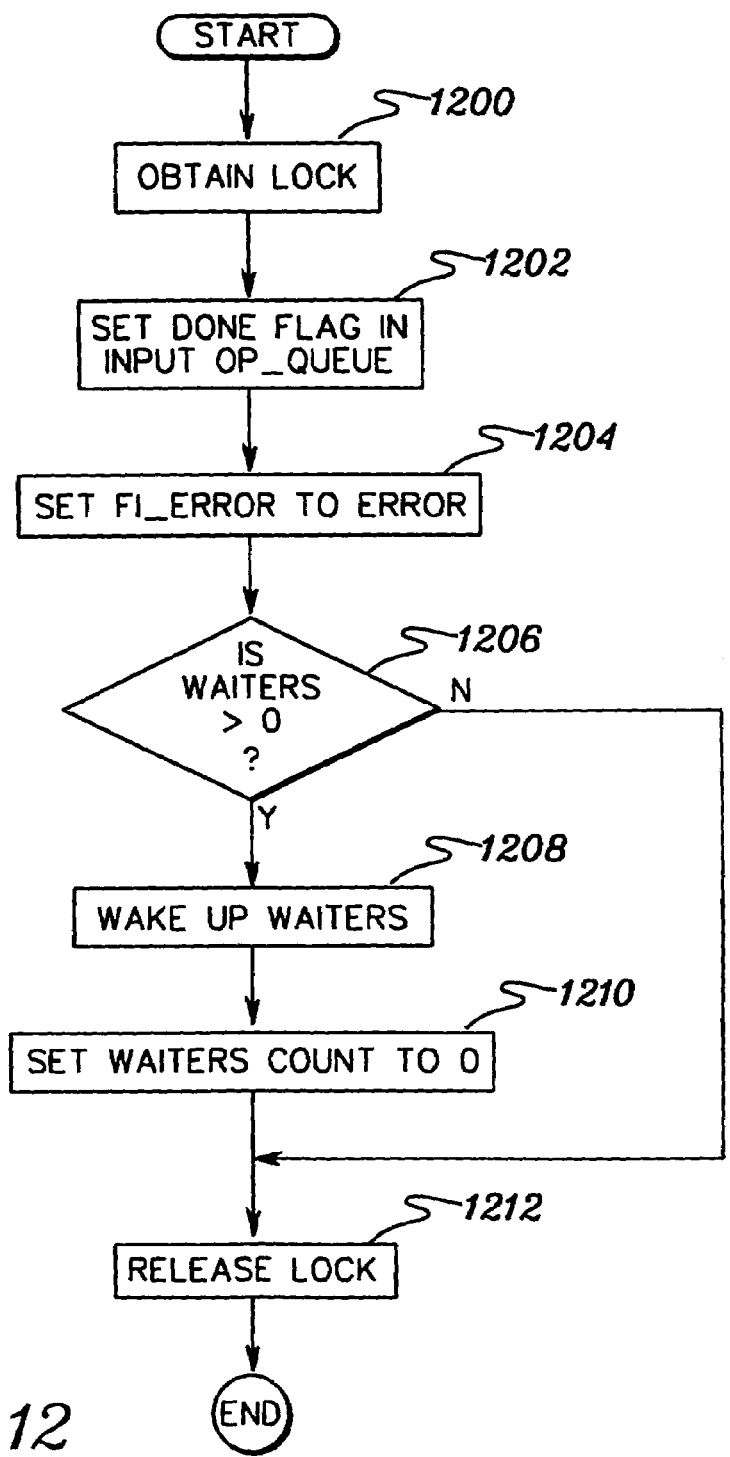
FIG. 12 depicts one embodiment of the logic associated with ending a file operation, in accordance with the principles of the present invention.

Referring to FIG. 12, initially, the file handle lock is obtained for serialization purposes, STEP 1200, and the Done flag in the input op_queue is set to complete, STEP 1202. Additionally, the fi_error of the file handle is set equal to the input error (if any), STEP 1204.

Subsequently, a determination is made as to whether the waiters field in the input op_queue is greater than zero, INQUIRY 1206. If it is greater than zero, then the waiters are awoken, STEP 1208, and the waiters count is set equal to zero, STEP 1210. Thereafter, or if the waiters field is not greater than zero, then the lock is released, STEP 1212. This completes the stop operation used to indicate that the operation is complete and to wake up the waiters.

Returning to FIG. 3d, after indicating that the operation is done or if this is not an open file based operation, any additional processing is performed, if necessary or desired, STEP 384. This processing is allowed to be performed in parallel for multiple operations hitting the same file.

Subsequently, a determination is made as to whether this is a file close operation, INQUIRY 385. If this is not a file close operation, then SMBparser sends a reply SMB to the client, if one has not already been sent, STEP 386. On the other hand, if this is a file close operation, then a determination is made as to whether there are any previous errors, STEP 387. In one example, this determination is made by a query routine that retrieves the latest error on the file, if needed or desired by SMBparser. In particular, the routine returns the value stored in the fi_error field. Input to the routine is the op_queue cookie, and the perror field.

Subsequent to determining if there are any errors, the reply is sent, if it has not already been sent, STEP 386. This reply will include any error determined in the previous step.

In addition to the above, a remove operation is performed, STEP 388. In one example, this routine removes the file operation from the queue and records any additional error found after calling the physical file system. Returned from this routine is any prior error found. When the SMB close operation calls the remove file operation, any previous physical file system call errors for the file will be included. Thus, the client is informed in its reply, if an error occurred.

One embodiment of a remove operation is described with reference to FIG. 13. As one example, input to the remove operation is a cookie having the address of the op_queue; any post physical file system error (error); and an address to return any prior error (perror).

Figure 13:
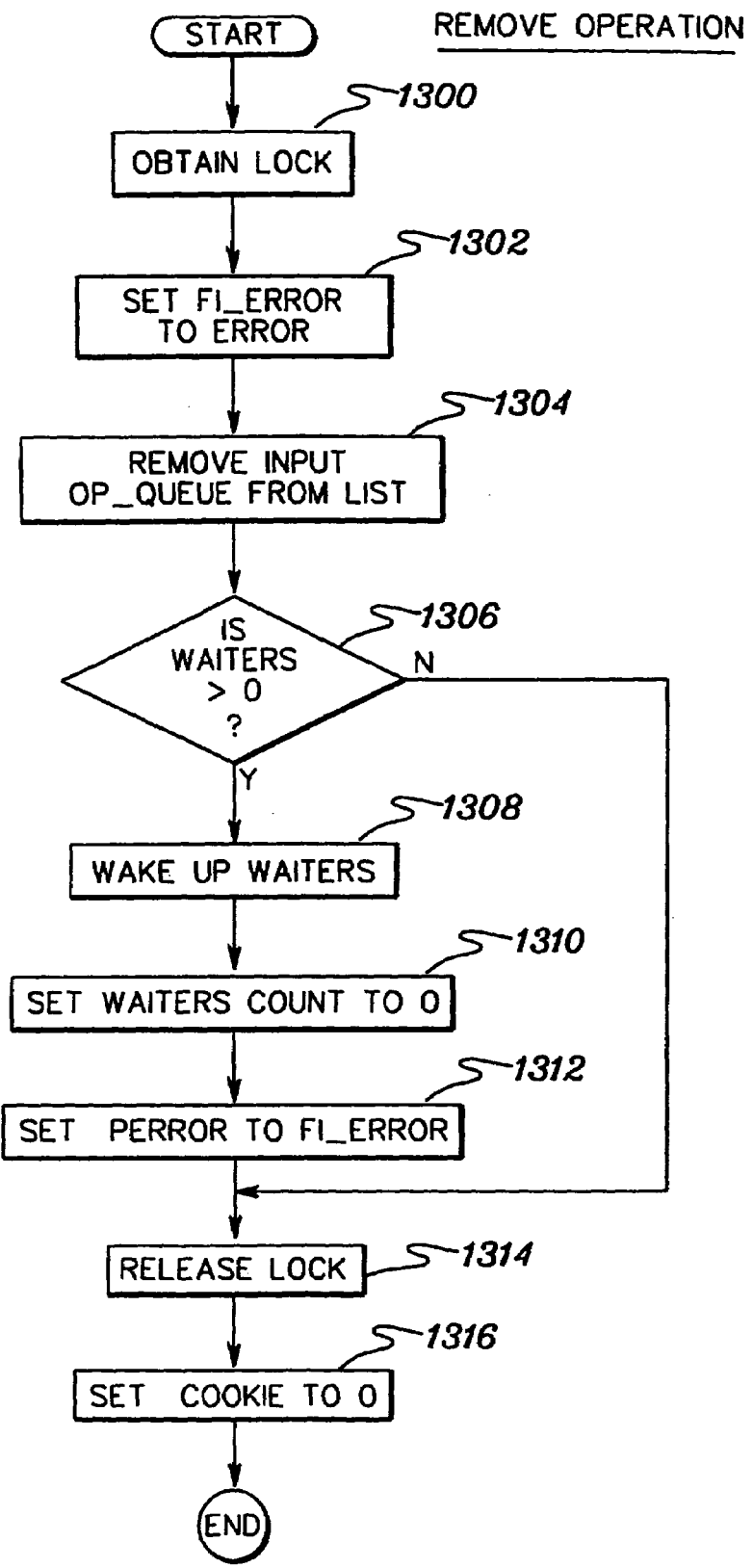
FIG. 13 depicts one embodiment of the logic associated with removing a file operation from the data structure of FIG. 4, in accordance with the principles of the present invention.

Referring to FIG. 13, initially, a file handle lock is obtained, STEP 1300, and the file error (fi-error) is set equal to the error, if any, STEP 1302. Additionally, the input op_queue is removed from the queue data structure, STEP 1304.

Thereafter, a determination is made as to whether the waiters field in the input op_queue is greater than zero, INQUIRY 1306. If waiters is greater than zero, then the waiters are awoken, STEP 1308. Additionally, the waiters count is set to zero, STEP 1310, and perror is set equal to the fi_error, STEP 1312.

Subsequently, or if waiters is not greater than zero, then the file handle lock is released, STEP 1314, and the cookie is set equal to zero, STEP 1316. This concludes the remove operation.

Figure 14:
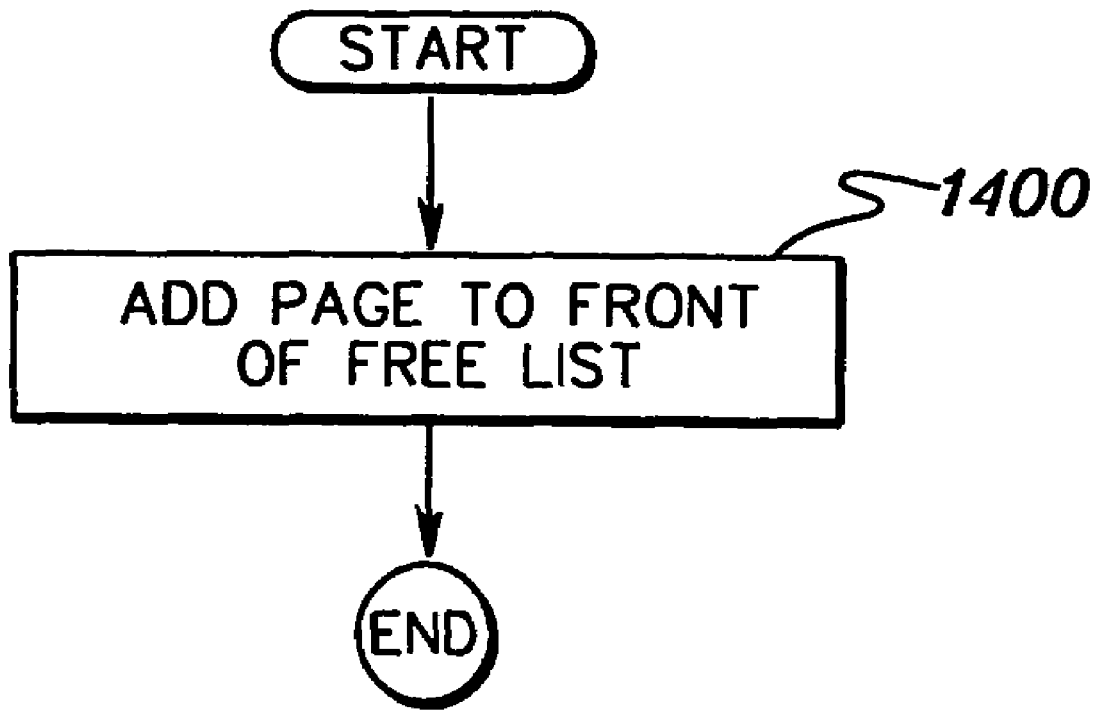
FIG. 14 depicts one embodiment of the logic associated with freeing a buffer, in accordance with the principles of the present invention.

Returning to FIG. 3d, in additional to performing the remove operation, the data buffers are returned to free storage, STEP 390. In one example, the data buffers are returned via a free page routine, one embodiment of which is described with reference to FIG. 14.

As one example, in order to return each data buffer, the page is added to the front of the free page list, STEP 1400. This is done for each data buffer to be returned. Often, the data buffers that are returned are not the original buffers. This completes the processing associated with various aspects of the present invention.

Described in detail above are capabilities that allow data to be transmitted directly from the physical file system cache buffers to the client for file reads; the ability to use buffer swapping for file writes to avoid data movement, especially for large file writes, in one instance; the ability to use handshaking and partial packet receive in the lower communications and SMBparsr layers to allow for quick replies for file writes, as one example, reducing delays in data transmission; and the ability to provide file operation queueing and latent error handling, which ensures the integrity of file writes given that quick replies are used.

One or more aspects of the present invention advantageously increase throughput as viewed by the end-user and also reduces server processor usage. Reducing the data movement in the server reduces server processor time per file read/write operations, and the quick replies ensure that data is sent to the server as fast as possible for file writes keeping the data streaming on the transmission medium.

With the various aspects of the present invention, no advance notice or prediction on the access pattern of data in the files is necessary. Additionally, one or more aspects of the present invention are independent of the communications adapter used.

The present invention is not limited to file serving or to SMB/CIFS filing serving. For example, the data movement reduction technique can be applied for any application, be it a file server or just an application running on the local machine that is calling the physical file system to reduce data movement.

As a further example, the partial packet receive processing and the quick reply techniques are applicable to various servers that processes requests from clients. For instance, they are applicable to a server that processes requests, where those requests affect some object the server manages, and the client requests that affect the object have a "start using object" and a "stop using object" request that bound the use of the object. An unlimited number of requests could occur between the start/stop request. For the file server, the start operation is file open and the stop operation is a file close.

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just exemplary. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of writing data from a client computer to a server computer, said method comprising the steps of:
   allocating a buffer in said server computer for use by a file server program within said server computer;
   receiving said data from said client computer via said file server program;
   writing said data into said buffer allocated to said file server program;
   determining whether said buffer is compatible to be swapped with a file system program buffer;
   setting a flag to indicate buffer swapping compatibility after determining the buffer is compatible with the file system program buffer; and
   reallocating said buffer to the file system program within said server computer, such that said file system program can directly access said data from said buffer when the flag indicates buffer swapping compatibility.

2. A method as set forth in claim 1 further comprising, prior to the receiving step, said file server program communicating with said client computer to permit said client computer to send said data to said server computer.

3. A method as set forth in claim 1 wherein after performing said reallocating step, said file system program writing said data from said buffer into storage.

4. A method as set forth in claim 3, further comprising the step of said file system program returning said buffer allocated to said file system program to free storage, subsequent to said writing step.

5. A method as set forth in claim 1 wherein after performing said reallocating step, said file system program directly accessing said data from said buffer without said data being transferred from said buffer.

6. A computer program product for writing data from a client computer to a server computer, said computer program product comprising:
   a computer readable storage medium;
   first program instructions of a file server program for execution within said server computer to allocate a buffer in the server computer for use by said file server program, receive data from said client computer and write said data into said buffer allocated to said file server program; and
   second program instructions for execution within said server computer to subsequently determine whether said buffer is compatible to be swapped with a file system program buffer, set a flag to indicate buffer swapping compatibility after determining the buffer is compatible with the file system program buffer, and reallocate said buffer to the file system program within said server computer when the flag indicates buffer swapping compatibility, such that said file system program directly accesses said data from said buffer; and wherein
   said first and second program instructions are recorded on said storage medium.

7. A computer program product as set forth in claim 6 wherein prior to said first program instructions receiving said data from said client computer, said first program instructions communicate with said client computer to permit said client computer to send said data to said server computer.

8. A computer program product as set forth in claim 6 wherein after said second program instructions reallocates said buffer to said file system program, third program instructions of said file system program writes said data from said buffer into storage; and said third program instructions are recorded on said storage medium.

9. A computer program product as set forth in claim 8, further comprising fourth program instructions for execution within said server computer to return said buffer allocated to said file system program to free storage, subsequent to said third program instructions writing said data to said storage; and wherein said fourth program instructions are recorded on said storage medium.

10. A computer program product as set forth in claim 6 wherein after said second program instructions allocate said buffer to said file system program, said file system program can directly access said data from said buffer without said data being transferred from said buffer.

11. A server computer to receive data from a client computer, said server computer comprising:
   means for allocating a buffer in the server computer for use by a file server program within said server computer;
   means for receiving data from said client computer and writing said data into said buffer allocated to said file server program within said server computer;
   means for determining whether said buffer is compatible to be swapped with a file system program buffer, and setting a flag to indicate buffer swapping compatibility after determining the buffer is compatible with the file system program buffer; and means for reallocating said buffer to the file system program within said server computer, such that said file system program directly accesses said data from said buffer when the flag indicates buffer swapping compatibility.

12. A server computer as set forth in claim 11 wherein prior to the receiving means receiving said data from said client computer, said file server program communicates with said client computer to permit said client computer to send said data to said server computer.

13. A server computer as set forth in claim 12 further comprising means within said file system program, responsive to said reallocating means reallocating said buffer to said file system program, for writing said data from said buffer into storage.

14. A server computer as set forth in claim 13, further comprising means for returning said buffer allocated to said file system program to free storage, subsequent to the writing means writing said data to said storage.

15. A server computer as set forth in claim 11 wherein after the reallocating means reallocates said buffer to said file system program, said file system program can directly access said data from said buffer without said data being transferred from said buffer.

16. A method as set forth in claim 1, further comprising the steps of:

determining that said data from said buffer is in a format not compatible with said file system program; and responsive to determining that said data from said buffer is in a format not compatible with said file system program, translating said data from said buffer into a format compatible with said file system program, said translating being performed within said buffer.

17. A computer program product as set forth in claim 6 further comprising third program instructions for execution within said server computer to determine whether said data from said buffer is in a format not compatible with said file system program; and responsive to determining that said data from said buffer is in a format not compatible with said file system program, translate said data from said buffer into a format compatible with said file system program, said translating being performed within said buffer; and said third program instructions are recorded on said storage medium.

18. A server computer as set forth in claim 11 further comprising means for determining that said data from said buffer is in a format not compatible with said file system program; and responsive to determining that said data from said buffer is in a format not compatible with said file system program, translating said data from said buffer into a format compatible with said file system program, said translating being performed within said buffer.

* * * * *

UNITED STATES PATENT AND TRADEMARK OFFICE
CERTIFICATE OF CORRECTION

PATENT NO. : 7,624,207 B2 Page 1 of 1
APPLICATION NO. : 10/981210
DATED : November 24, 2009
INVENTOR(S) : Scott Thomas Marcotte It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1141 days.

Signed and Sealed this

Twenty-sixth Day of October, 2010

David J. Kappos
*Director of the United States Patent and Trademark Office*